(12) United States Patent
Gleason

(10) Patent No.: US 6,834,409 B2
(45) Date of Patent: Dec. 28, 2004

(54) DOCK LEVELER

(75) Inventor: Denis Gleason, Bowmanville (CA)

(73) Assignee: Nordock, Inc. (CA)

( * ) Notice: Subject to any disclaimer, the term of this patent is extended or adjusted under 35 U.S.C. 154(b) by 0 days.

(21) Appl. No.: 10/328,279

(22) Filed: Dec. 23, 2002

(65) Prior Publication Data
US 2004/0117927 A1 Jun. 24, 2004

(51) Int. Cl.7 .................................................. E01D 1/00
(52) U.S. Cl. ........................................................ 14/71.3
(58) Field of Search ................................ 14/69.5, 71.1, 14/71.3, 71.5, 71.7

(56) References Cited

U.S. PATENT DOCUMENTS

| | | | |
|---|---|---|---|
| 3,685,077 A | 8/1972 | Wiener et al. ................... 14/71 |
| 3,835,497 A | 9/1974 | Smith .............................. 14/71 |
| 3,882,563 A | * 5/1975 | Smith et al. ................... 14/71.3 |
| 3,967,337 A | * 7/1976 | Artzberger ................... 14/71.5 |
| 4,847,935 A | 7/1989 | Alexander et al. ............ 14/71.3 |
| 4,928,340 A | 5/1990 | Alexander ................... 14/71.3 |
| 4,937,906 A | 7/1990 | Alexander ................... 14/71.1 |
| 4,944,062 A | 7/1990 | Walker ......................... 14/71.3 |
| 4,974,276 A | 12/1990 | Alexander ................... 14/71.3 |
| 4,977,635 A | 12/1990 | Alexander ................... 14/71.3 |
| 4,979,253 A | 12/1990 | Alexander ................... 14/71.7 |
| 5,001,799 A | 3/1991 | Alexander et al. ............ 14/71.1 |
| 5,097,557 A | 3/1992 | Salman et al. ................ 14/71.1 |
| 5,111,546 A | 5/1992 | Hahn et al. .................... 14/71.3 |
| 5,117,526 A | 6/1992 | Alexander ................... 14/71.7 |
| 5,303,443 A | 4/1994 | Alexander ................... 14/71.1 |
| 5,396,676 A | 3/1995 | Alexander et al. ............ 14/71.1 |
| 5,440,772 A | 8/1995 | Springer et al. .............. 14/69.5 |
| 5,813,072 A | 9/1998 | Alexander ................... 14/71.1 |
| 5,826,291 A | 10/1998 | Alexander ................... 14/71.3 |
| 6,125,491 A | 10/2000 | Alexander ................... 14/69.5 |

* cited by examiner

Primary Examiner—Robert E. Pezzuto
Assistant Examiner—Alexandra Pechhold
(74) Attorney, Agent, or Firm—Andrus, Scales, Starke & Sawall, LLP

(57) ABSTRACT

The present invention pertains to a mechanically actuated dock leveler with a mounting frame secured in a pit of a loading dock, and a deck assembly with a deck and extendable lip. A deck lift assembly biases the deck to move from a parked position to a raised position to activate a lip extension assembly. As the deck is "walked down", the lip is extended and the lip extension assembly is deactivated in a controlled manner so that the deck and lip reach an engaged position against the trailer and are kept in place by a hold down mechanism. The deck assembly has a float housing with a slot for releasably engaging the lift assembly to achieve a range of float positions where the deck and lip rest on and float with the trailer as it is loaded and unloaded. The deck assembly has a durable combined lip lug and header plate hinge construction.

19 Claims, 17 Drawing Sheets

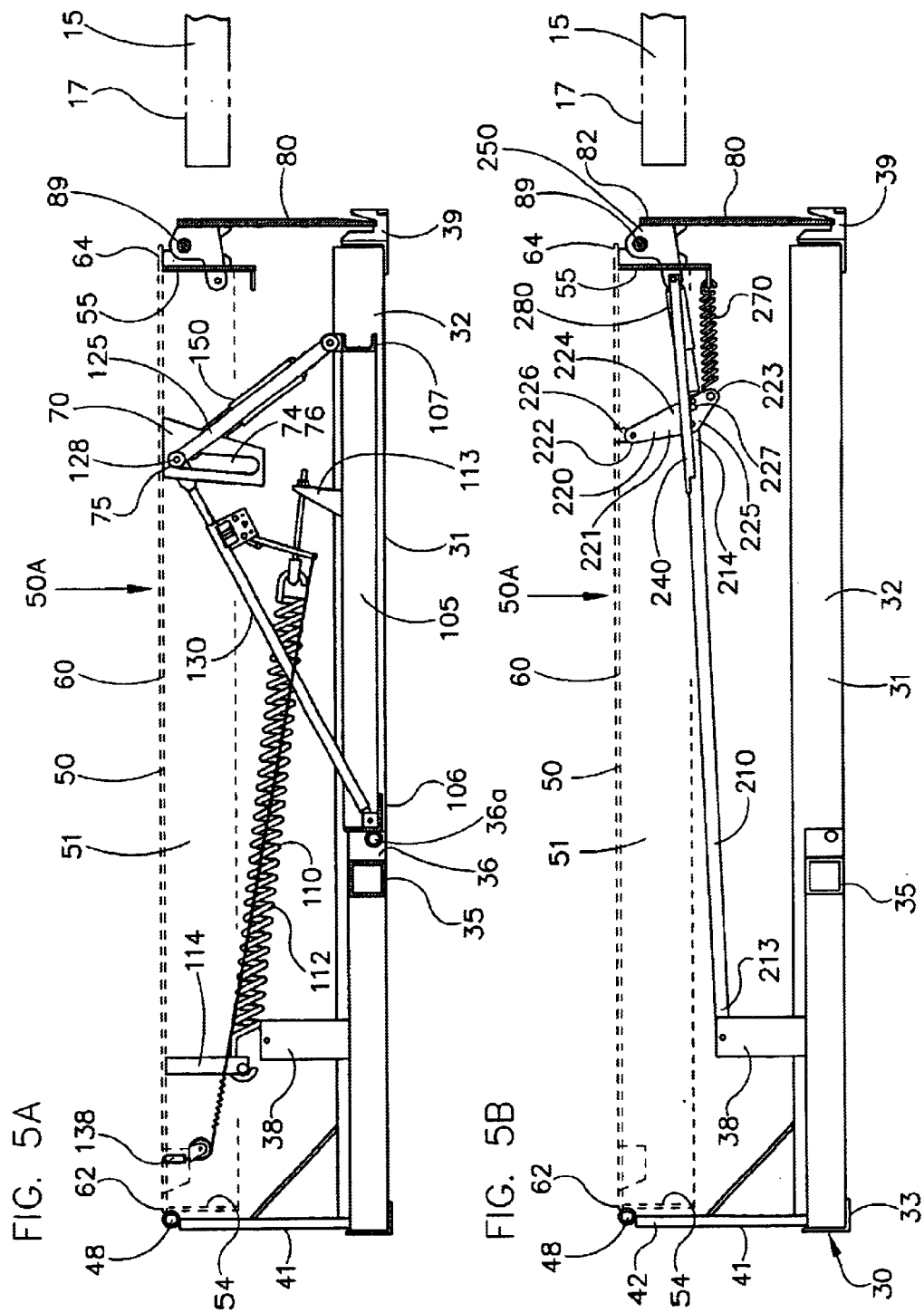

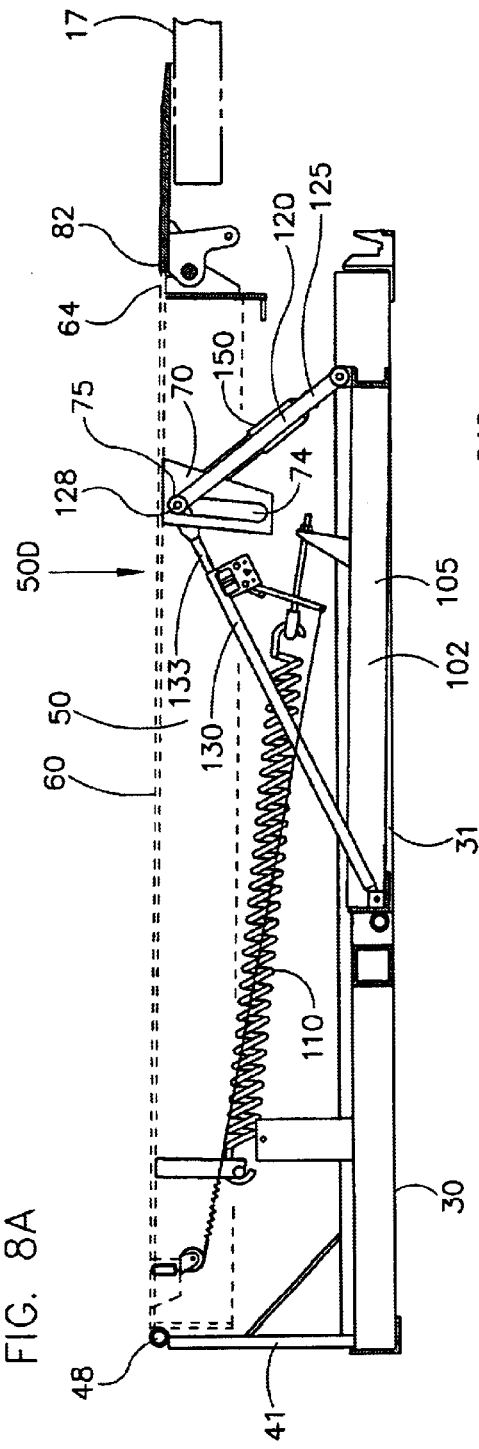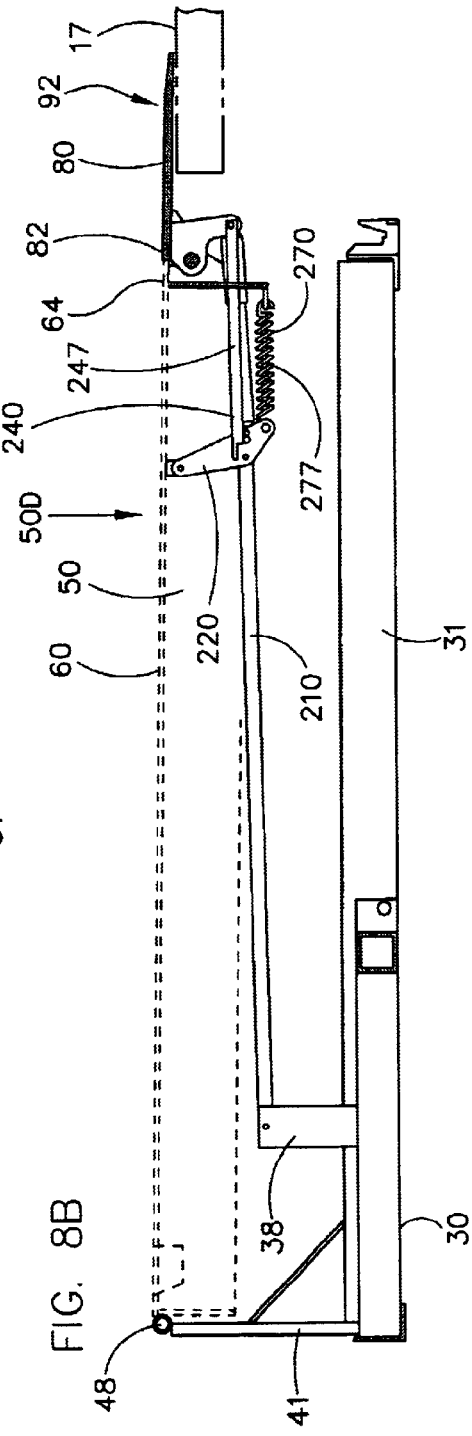

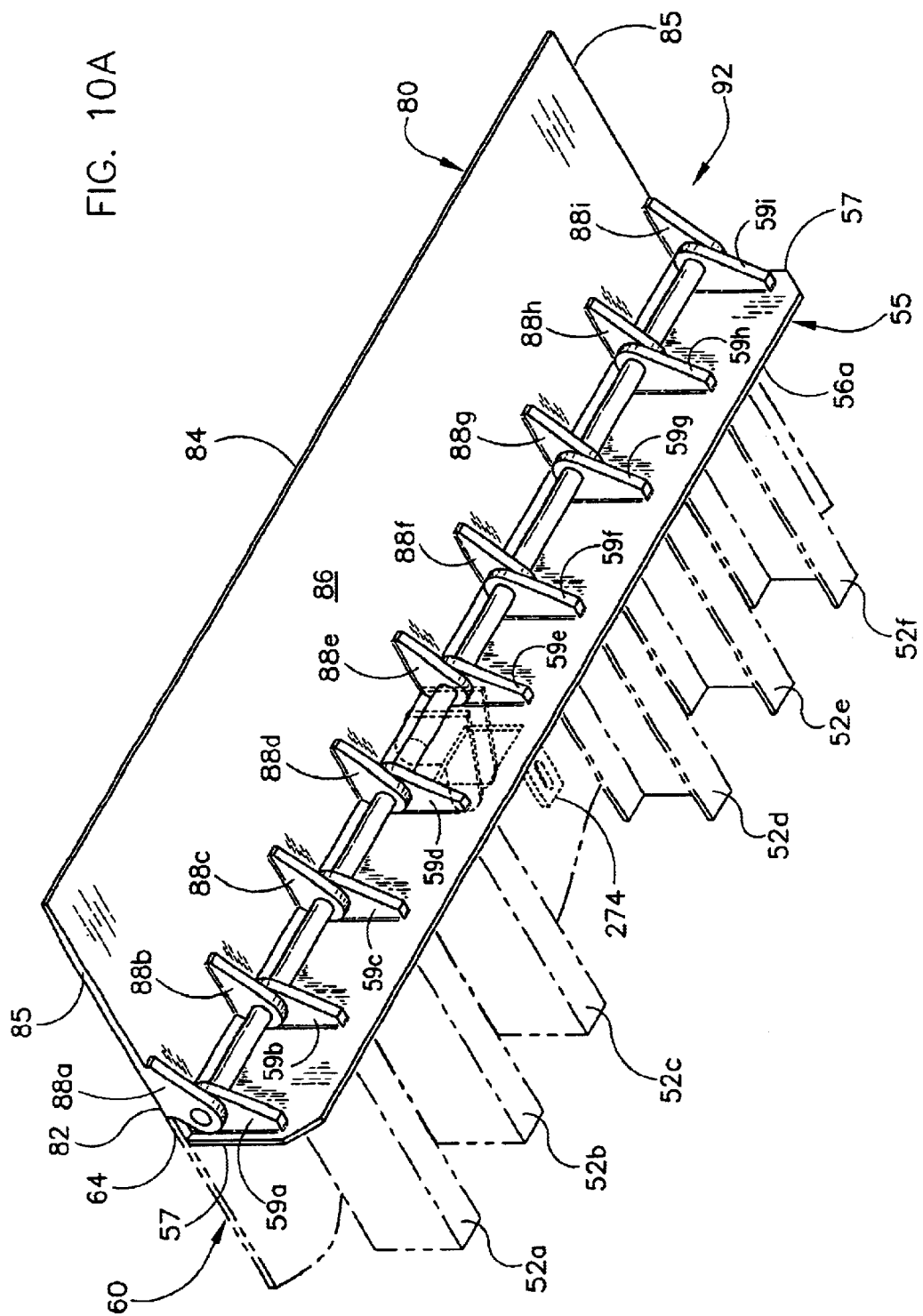

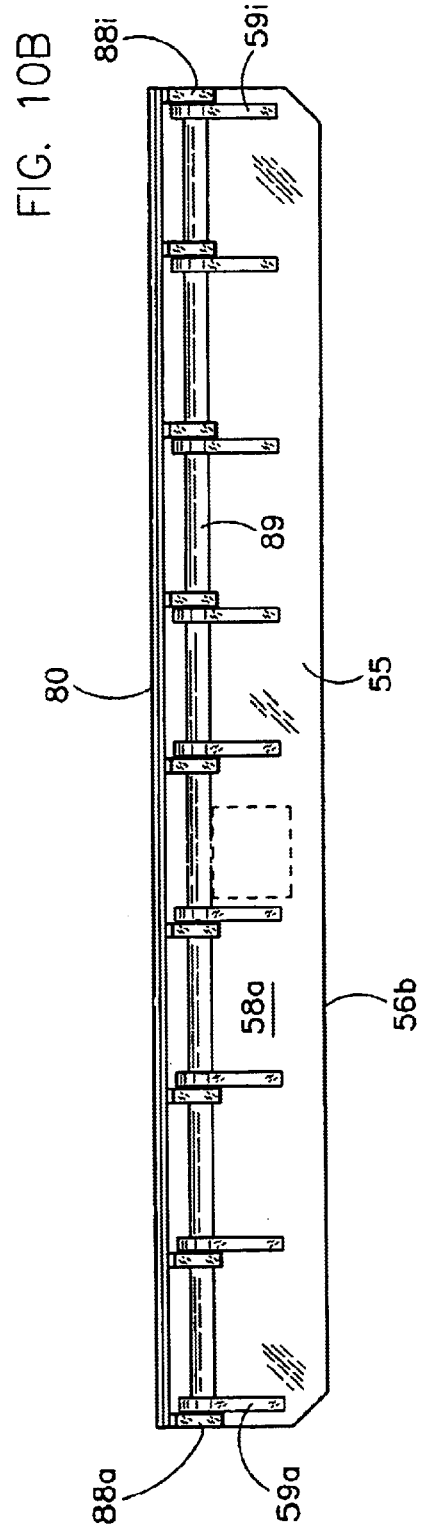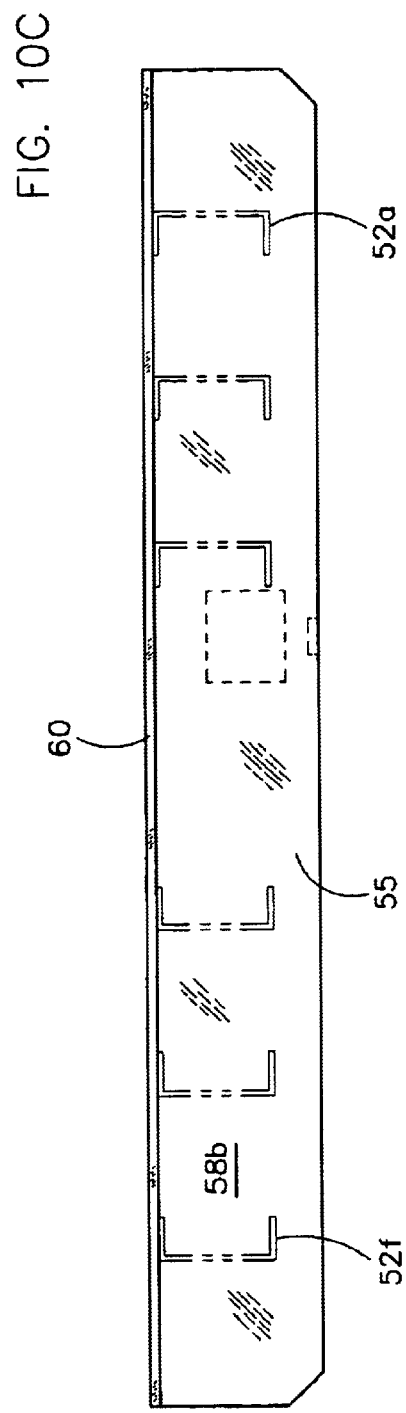

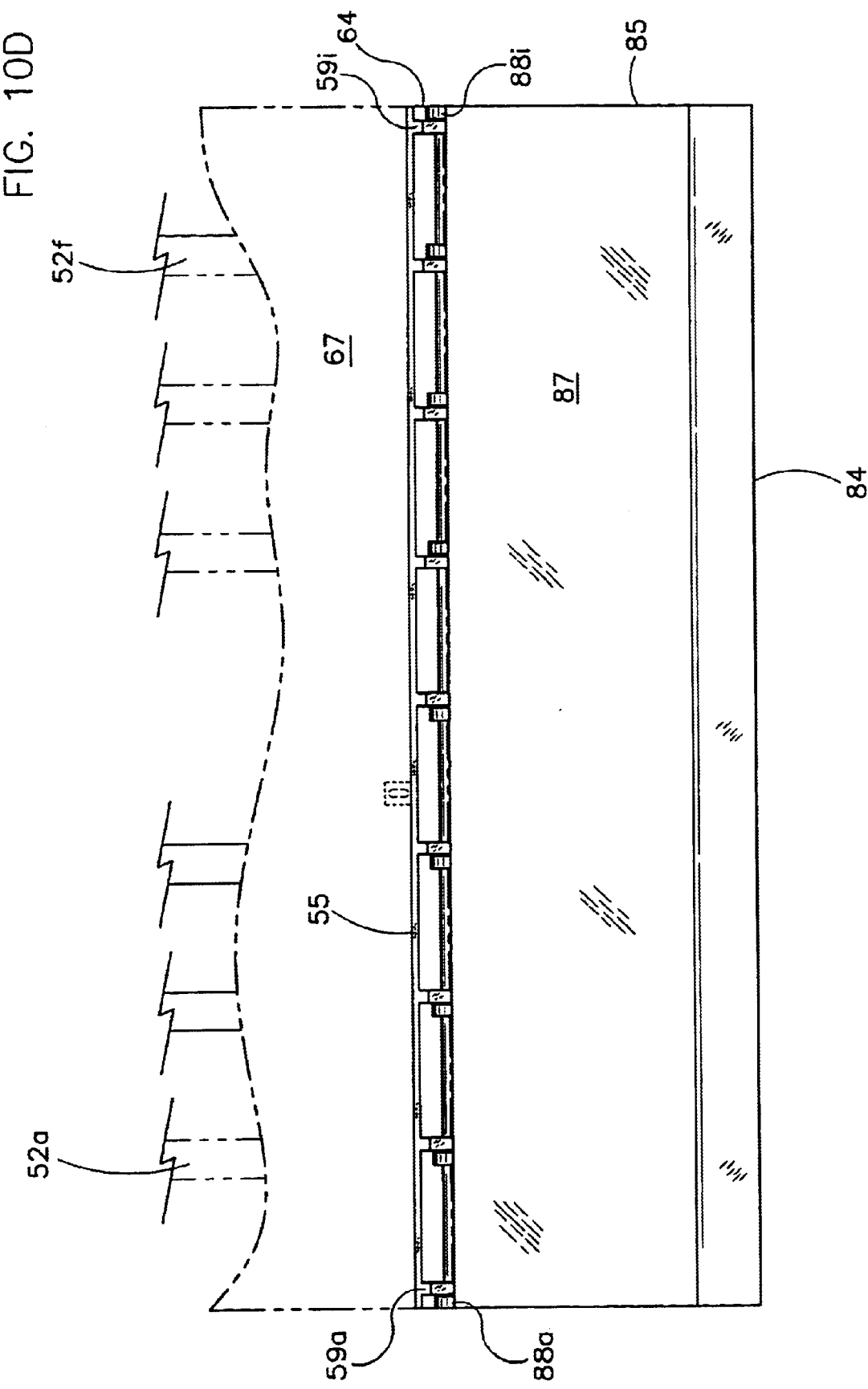

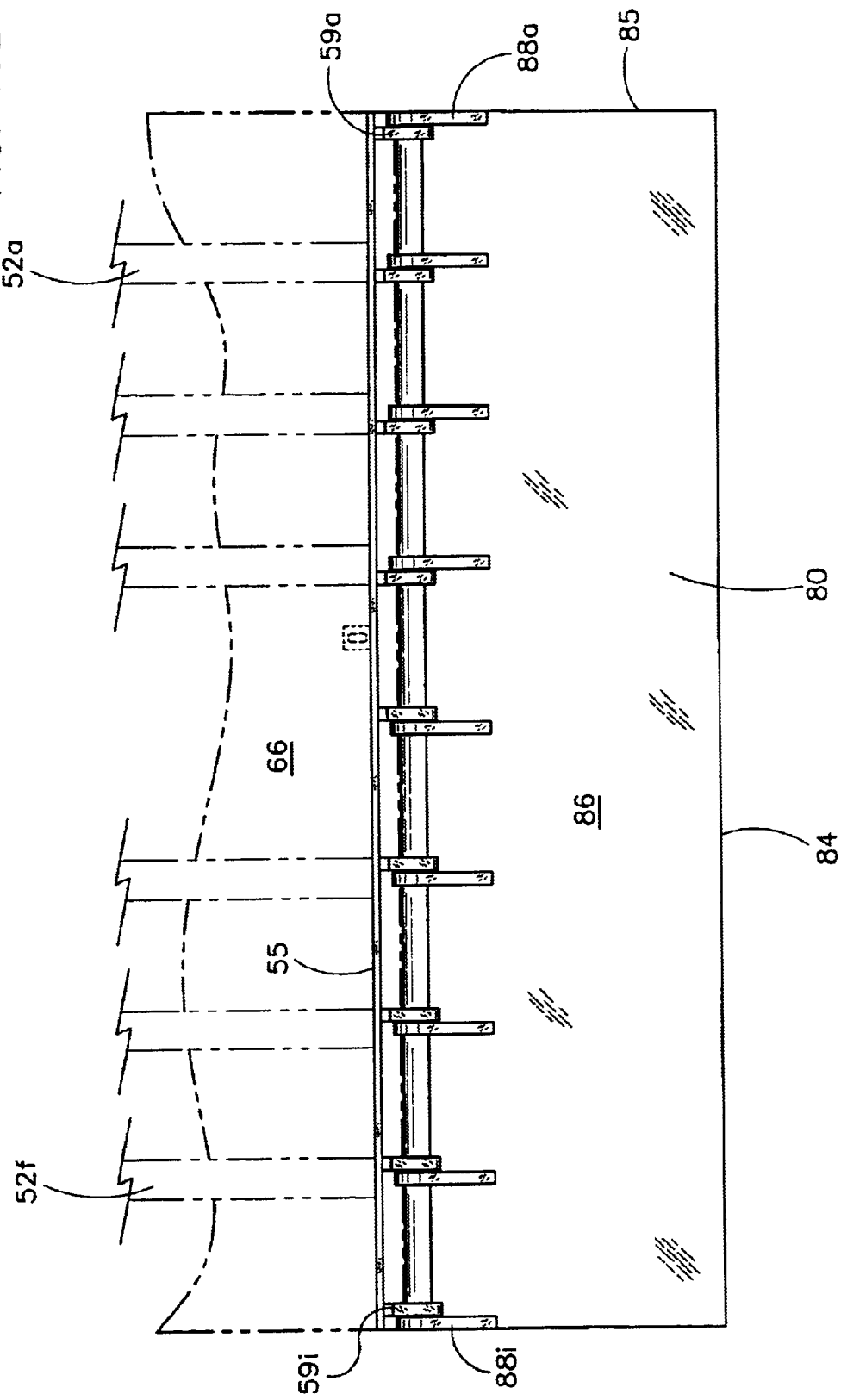

DOCK LEVELER

TECHNICAL FIELD OF THE INVENTION

The present invention relates to a dock leveler with a deck lift assembly that allows a deck and extended lip to rest on and float with a trailer bed as it is unloaded, a lip extension mechanism that activates when the deck is raised and deactivates when it is lowered, and a deck assembly with a combination lip lug and header plate hinge attachment.

BACKGROUND OF THE INVENTION

Dock levelers are used to transfer goods between a building and a truck trailer. Dock levers bridge the gap between the building floor to the bed of the trailer or similar carrier. Dock levelers include a frame or support structure for mounting the leveler in a pit of a loading dock. The rear end of a conventional dock leveler is hinged to the building floor. The opposite end has an extendable lip plate that pivots out and onto the trailer bed. Levelers are adapted to move from a generally horizontal position where the upper surface of the deck is flush with the surface of the building floor to a second generally inclined position to provide a ramp between the bed of the truck and the dock floor.

Dock levelers are typically actuated by springs, hydraulics or the like. U.S. Pat. No. 3,137,017 pertains to a spring actuated leveler. U.S. Pat. Nos. 4,619,008 and 4,955,923 pertain to hydraulic levelers. Other dock levers are shown and described in U.S. Pat. Nos. 3,299,456; 3,368,229; 3,530,488, 3,835,497; 3,858,264;3,877,102; 3,995,342; 4,126,909; 4,279,050; 4,328,602; 4,455,703 and 4,922,568, the disclosures of which are incorporated by reference herein.

Mechanically actuated dock levelers typically support the weight of the deck by springs. The springs are biased to propel the deck upward when a hold down device is released. An operator releases the hold down mechanism to initiate the loading cycle or to reposition the leveler when finished loading. The front lip plate pivots from a hanging or pendant position to an extended position when the ramp is rising or when the operator walks the ramp down. The lip is typically extended by an actuator and held in its extended position by another mechanism. For example, the lip can be extended by a chain attached to the lower frame that tightens as the deck reaches the top of its travel as in U.S. Pat. No. 3,137,017. The lip is held in the extended position by a latch until the dock leveler is "walked down" to a proper position where the lip makes contact with the bed of the trailer. The lip is then supported by the truck, and the latch falls away.

A problem with conventional dock levelers is that the hold down device does not properly allow the deck to rise with the trailer bed as the trailer is unloaded. The hold down device typically has a brake that is allowed to slip or a float spring that compress. Unfortunately, both of these designs have inherent flaws. The slipping action of the brake-type devices causes wear. Adjustment is often required to keep the proper tension. This adjustment varies with different leveler sizes and if not done properly will either slip too easily or hold too tightly and increase wear. Eventually, breakage occurs due to the constant applied friction. The use of a float spring removes the need for adjustment by replacing the slip action with a hold down spring. The problem with float springs is that they cause a "bouncing effect" that allows the lip plate and deck plate to separate during loading, increasing the frequency of impacts and stress on the front hinge area where most structural failures occur. This problem increases in time as the springs fatigue, weakening its holding ability and increasing the bounce and impact stress.

Another problem with conventional dock levelers is that they tend to lose their ability to fully extend the lip. The lip extension mechanisms begins to fail due to wear and other environmental considerations, a lack of lubrication or spring fatigue. Instead of latching and holding in an outward position, the lip tends to fall back to its pendent position. The leveler remains inoperative until proper lip extension is restored by periodic preventive maintenance or adjustment of the springs. Even a short outage can be significant given that these devices typically operate in a heavy industrial context.

Other levelers replace the mechanical latch with a hydraulic damper that permits the lip to be extended freely but restricted its retraction. Even if the lip is not fully extend, the damper will retard its retraction long enough for the operator to walk the leveler down to the truck bed. Hydraulic dampers also quickly retract under high load, which can protect the lip mechanism from damage when the lip is accidentally struck by a truck that backs into the lip while still extended. Still, hydraulic dampers have two significant drawbacks. First, the damper begins to retract as soon as the load is applied, and the operator must walk the leveler down immediately. Second, the viscosity of the hydraulic fluid is sensitive to changes in temperature. In warm temperatures, the lip falls too quickly for it to come to rest on the truck bed. In cold temperatures, the lip falls too slowly when the leveler is removed from the truck.

A further problem with conventional dock levelers is that the wider, longer or thicker the lip, the harder it is to extend and hold the lip in position. A loaded spring is typically used to assist in extending the lip. Although the assist spring is loaded at all times, the available force of the assist spring is contained when the lip is in its pendent or parked position. The assist spring typically does not start to work until the dock leveler is raised and the lip has already begun to extend. This loss of effective power occurs at the start of its extension, when the assist spring is needed most. Yet, increasing the tension or force of the assist springs makes it harder to walk the unit down.

A still further problem with dock leveler design is controlling the rate the lip retracts from its extended position to its pendent position. Conventional levelers use a damper as part of the lip operation to control the rate of retraction of the lip. Different dampers are required for different lip sizes and weights. One damper may allow a heavy lip to fall too quickly, or a lightweight lip to retract too slowly. As noted above, hydraulic dampers also suffer from variations in the viscosity of the hydraulic fluid due to fluctuations in temperature.

A still further problem with dock levelers is the integrity and durability of the hinge that joins the lip plate to the deck frame. This connection is a critical part of the leveler as it must withstand concentrated stresses as the fork lift and the load it is carrying traverse from the building to the trailer, or visa versa. Conventional dock leveler designs, weld a tubular hinge to the lip plate and to the header plate. The header plate is welded to the deck plate and deck support beams. The concentrated stresses on the tubular hinge traditionally result in stress cracks in the plates and their welds. A second design uses lip plate lugs to lessen these stresses. In lieu of a header plate, cooperating lugs are also welded to the support beams and deck plate. A problem with this design is that the unsupported front edge of the deck plate is more easily bent and dished between the support beams.

The present invention is intended to solve these and other problems.

BRIEF DESCRIPTION OF THE INVENTION

The present invention pertains to a mechanically actuated dock leveler with a mounting frame secured in a pit of a loading dock, and a deck assembly with a deck and extendable lip. A deck lift assembly biases the deck to move from a parked position to a raised position to activate a lip extension assembly. As the deck is "walked down", the lip is extended and the lip extension assembly is deactivated in a controlled manner so that the deck and lip reach an engaged position against the trailer and are kept in place by a hold down mechanism. The deck assembly has a float housing with a vertical slot for releasably engaging the lift assembly to achieve a range of float positions where the deck and lip rest on and float with the trailer as it is loaded and unloaded. The deck assembly has a durable combined lip lug and header plate hinge construction.

One advantage of the present dock leveler invention is that its integrated lifting mechanism combines an upward biased deck lift assembly with a hold down device without permanently attaching the lift assembly or hold down device to the deck or ramp. The deck assembly rests on and floats with the trailer bed as the trailer is unloaded and loaded. The up and down float action created by the trailer springs is removed from the hold down, which removes unnecessary stresses and wear and tear on the dock levelers. Breaks and other friction devices that tend to wear out are avoided, as is the bouncing effect created by the lifting springs or hold down float spring.

Another advantage of the present dock leveler is that the deck remains level during storage and use. The deck lift assembly is centered symmetrically beneath the deck assembly and pushes up against the deck assembly at a central location along its width. The hold down device also attaches to the center of the deck lift assembly along its width. This symmetrical structure eliminates twisting forces on the deck or ramp by the deck lift assembly or the hold down device. Because the hold down is an integral part of and centered within the deck lift assembly, twisting caused by the lift springs or hold down device is avoided. As a result, the deck remains level during use and during storage so that the deck is level to the floor of the dock and an overhead door can close on top of it.

A further advantage of the present dock leveler is that it cushions or controls the rate of speed the floating deck drops down to its home position or raises up to its raised position. A damper is attached directly to and between the deck and deck lift assembly. This damper cushions or controls the rate of speed that the deck drops down when it returns to its home position from a floating position, such as when a trailer is pulled away from the dock when the deck and lip are still resting on the trailer. The damper also cushions or controls the rate of speed of the deck lift assembly rises to engage the floating deck assembly when the hold down mechanism is released and the deck and lip are in a floating position resting on the trailer bed. The deck damper reduces any impact forces when either the trailer leaves while the lip is still engaged on its bed, or when the hold down is released to raise the ramp before returning the ramp to its parked position.

A still further advantage of the present dock leveler is that the rear end of the lip and the front end of the deck remain in a tight abutting engagement while the deck and lip are floating on the trailer bed. This tight abutting engagement eliminates the wear and tear caused by constant impact forces when the lip pivots and separates from the deck, and then slams back into abutting engagement with the deck.

A still further advantage of the present dock leveler invention is that it avoids the aforementioned limitations of conventional lip extension mechanisms. The lip extends when the deck is walked down by a lip extension damper that is directly linked to the lip. The lip extension damper is used to extend the lip rapidly instead of only restricting the retraction of the lip. This allows the lip damper to control lip extension and retraction. Fewer parts are needed. In addition, different size lips do not diminish the effectiveness of the lip damper.

A still further advantage of the present dock leveler is its use of a lip assist spring that activates as the ramp rises and deactivates when the ramp lowers. This allows for a much easier lip extension resulting in a less walk-down force, more efficient use of power and a less restricted lip retraction.

A still further advantage of the present dock leveler is that it provides a linkage device that engages to initiate the lip extension when the deck assembly is raised, and then disengages before the lip fully extends and before the hold down device is engaged. This ensures that the lip cannot be left in an extended position to be impacted by an incoming trailer. This also allows the lip to retract if an obstruction is present at the rear of a trailer.

A still further advantage of the dock leveler is its solid and durable attachment of the lip to the deck and deck frame. A header plate is used to support the front edge of the deck plate across its full width. This header plate is combined with a lip plate lug type hinges to reduce the concentrated stresses on the tubular hinge to provide a longer structural life for the dock leveler.

Other aspects and advantages of the invention will become apparent upon making reference to the specification, claims and drawings.

BRIEF DESCRIPTION OF THE DRAWINGS

FIG. 5A is a side sectional view of FIG. 5 showing the mounting frame, deck assembly and the deck lift assembly.

FIG. 5B is a side sectional view of FIG. 5 showing the mounting frame, deck assembly and lip drive mechanism.

FIG. 8A is a side sectional view of the dock leveler in an engaged position and showing the mounting frame, deck assembly, and deck lift assembly with the lip engaging the trailer bed.

FIG. 8B is a side sectional view of the dock leveler in its engaged position and showing the mounting frame, deck assembly, and lip extension mechanism with the lip engaging the trailer bed.

FIG. 10A is a perspective view of the lip and hinge plate of the dock leveler, showing the lip in its extended position, and showing the deck frame support beams, a drive bracket and opening, and an assist spring mounting bracket in phantom.

FIG. 10B is a front view of the lip and hinge plate of the dock leveler.

FIG. 10C is a rear view of the lip and hinge plate of the dock leveler.

FIG. 10D is a top view of the lip and hinge plate of the dock leveler.

FIG. 10E is a bottom view of the lip and hinge plate of the dock leveler.

DESCRIPTION OF THE PREFERRED EMBODIMENTS

While this invention is susceptible of embodiment in many different forms, the drawings show and the specification describes in detail a preferred embodiment of the invention. It should be understood that the drawings and specification are to be considered an exemplification of the principles of the invention. They are not intended to limit the broad aspects of the invention to the embodiment illustrated.

Figure 1:
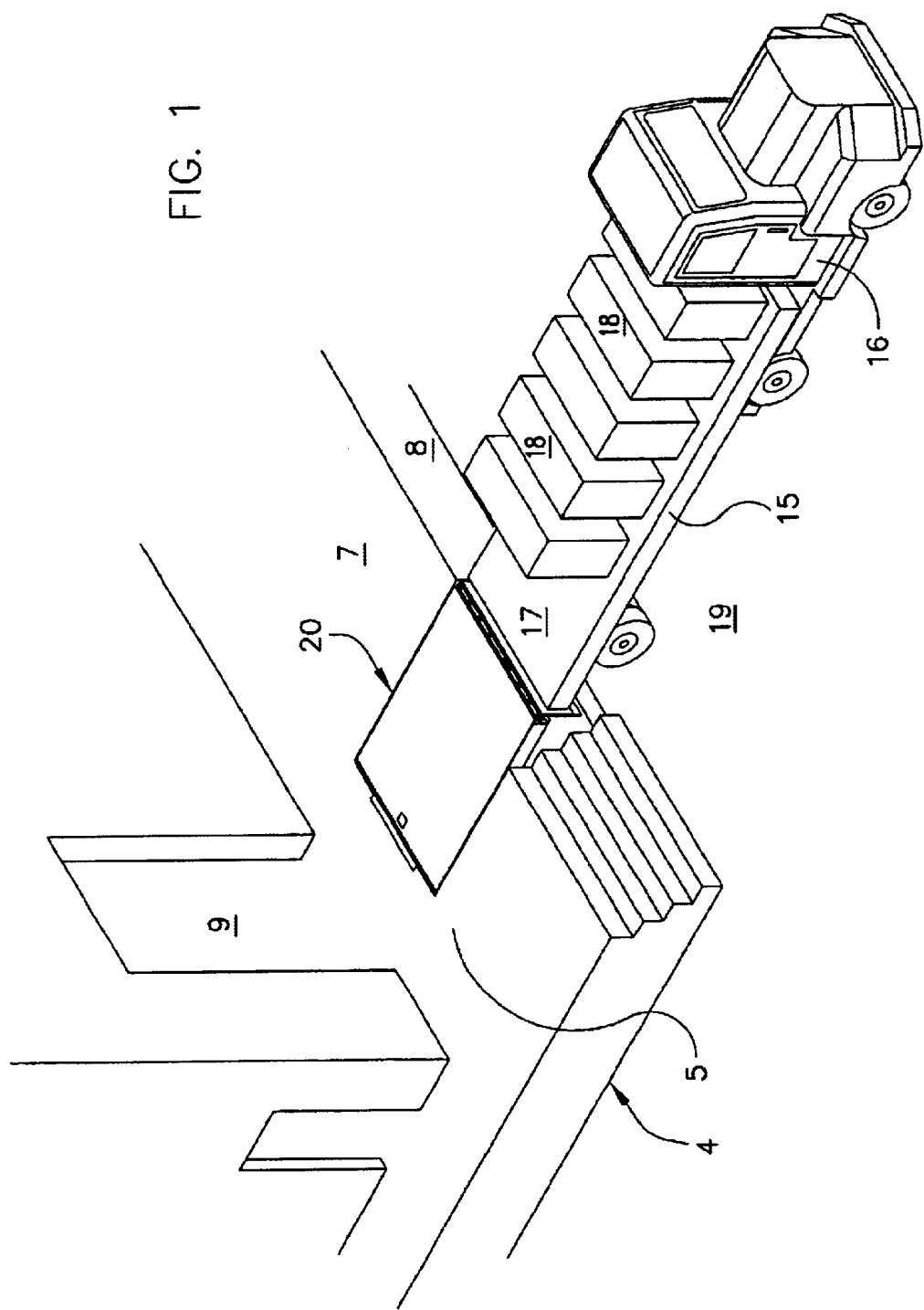
FIG. 1 is a perspective view of a loading dock of a building equipped with the present dock leveler invention, and a truck and trailer carrying a heavy load backed up to the dock leveler.
Figure 2:
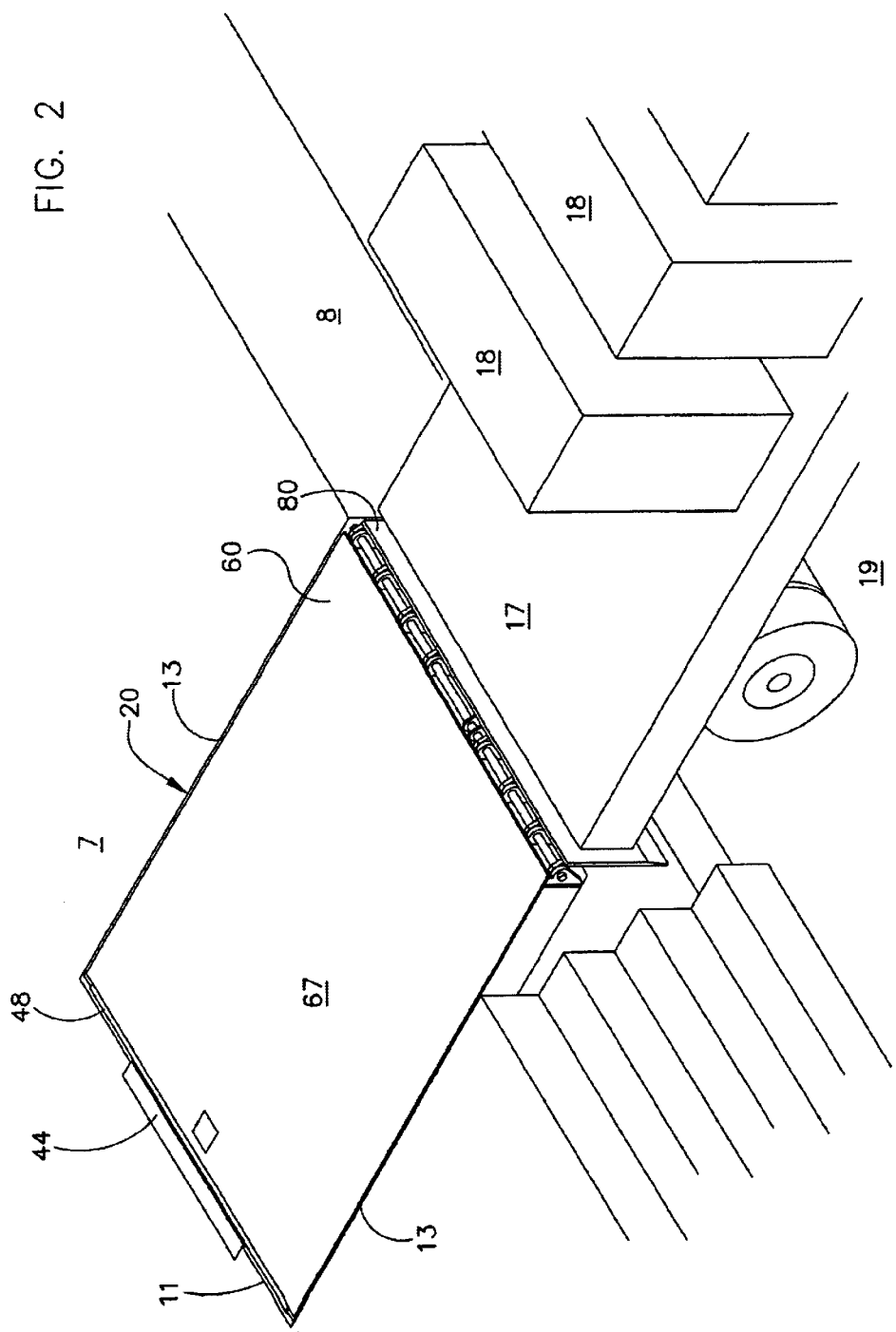
FIG. 2 is an enlarged view of FIG. 1 showing the dock leveler in its parked position with its deck even with the floor of the loading dock and slightly misaligned with and higher than the trailer bed.

FIG. 1 shows a building or structure 4 with a loading dock 5. The loading dock 5 has a generally flat, horizontal, elevated floor surface 7 and a generally vertical front wall 8. The building 4 has a doorway 9 with an overhead door (not shown). The loading dock 5 has a pit 10 of sufficient depth to house a dock leveler. The pit 10 has a rear wall or surface 11, a bottom floor or surface 12, opposed sidewalls or surfaces 13, and an open front. The floor 12 of the pit 10 is generally horizontal or slightly sloped for drainage, and is spaced a desired distance from the floor 7 of the loading dock 5. The walls 11 and 13 are generally vertical or normal to the floor surfaces 7 and 12. Although the walls of the building 4 and doorway 9 are shown set back from the front wall 8 of the loading dock 5, it should be understood that the building walls and door could be aligned closer to or flush with the front wall 8 without adversely impacting the invention. For example, an overhead door can be positioned directly above the dock leveler toward the open front end of the pit 10.

The loading dock 5 is designed to facilitate access to a trailer 15 of a truck 16 or other carrier. The trailer 15 has a bed 17 upon which items 18 are placed for transport. The trailer bed 17 is spaced above the road or surface on which the trailer is traveling, and the floor 7 of the loading dock 5 is spaced a desired distance from its adjacent driveway or approach 19 so that a trailer bed 17 is somewhat near the level of the dock floor 7 when the rear end of the trailer 15 is backed up to the front of the dock. The floor 12 of the pit 10 is elevated a desired height above the driveway 19, but could be even with or lower than the driveway depending on the particular circumstance without departing from the broad aspects of the invention. The height of the trailer bed 17 relative to the dock floor 7 depends on a variety of factors that include the particular trailer 15 involved and the weight of the item or items 18 on the trailer 15. The trailer bed 17 rises and falls relative to the floor 7 as items 18 are placed on or removed from the trailer 15.

The present invention relates to a dock leveler generally indicated by reference number 20 and shown in FIGS. 2–5. The dock leveler 20 has a variety of components including a mounting frame 30, a deck assembly 50 with an extendable lip 80, a deck lift assembly 100 and a lip extension mechanism 200. The components are robustly designed to support the weight of the deck assembly 50 and the loads it is intended to carry when fork lifts and the like carry items 18 over the leveler 20. The components are generally made of industrial grade steel or materials of similar strength and durability. The components may be painted, coated or otherwise treated to inhibit rust or corrosion.

The mounting frame assembly 30 is located along the floor 12 and rear wall 11 of the pit 10. The frame assembly 30 has front and rear ends, and includes a generally horizontal base frame or platform 31 that is bolted or otherwise rigidly anchored to the floor 12, and a generally vertical riser frame 41 that is similarly anchored to the rear wall 11. The base frame 31 spans the length of the assembly 30, and includes two spaced apart, generally parallel side beams 32 that are rigidly joined by a rear mounting channel 33 located at the rear end of the base frame. The base frame 31 also includes two forward mounting channels 34 located at its front end. The mounting channels 33 and 34 are rigidly anchored to the floor 12 of the pit 10, and the side beams 32 are welded, bolted or otherwise rigidly secured to the mounts 33 and 34. A cross beam 35 is welded or otherwise rigidly secured to the side beams 32 toward the mid section of the base 31. The cross beam 35 has a bracket 36 rigidly secured to and extending forward from its front surface. The bracket 36 supportably receives a pivot rod 36a. The base frame 31 also includes a longitudinal beam 37 located between and generally parallel to the side beams 32. One end of the longitudinal beam 37 is rigidly secured to the cross beam 35 and the other end is rigidly secured to the rear mounting channel 33. A post 38 extends upwardly and generally vertical from the longitudinal beam 37. The post 38 has a top end that supportably receives a pivot rod 38a. The pivot rod 38a is spaced a predetermined distance above the base frame 31 and floor 12. A lip support 39 is rigidly fixed to the front surface of each front mount 34. The beams and post 32, 35, 37 and 38 preferably have a square cross-sectional shape, and the mounts 33 and 34 preferably have an L-shaped cross-sectional shape.

The riser 41 is located along the rear wall 11 of the pit 10, and is preferably welded or otherwise rigidly secured to the rear end of the base frame 31. The riser 41 includes three evenly spaced, generally parallel side beams 42, joined together by an upper mounting channel 44 and the rear mount 33 of the base frame 31. The two outer risers 42 are aligned with the side beams 32. The bottom ends of each riser 42 is rigidly secured to the rear end of its respective side beam 32 or to the rear mount 33. Each of the outer risers 42 has an angled brace 46. Each brace 46 is welded or otherwise rigidly secured to its respective side beam 32 and riser 42. The mounting channel 44 is aligned against and anchored to one or both of the top of the rear wall 11 and the floor 7 of the loading dock 5. The risers 42 are rigidly secured to the upper mount 44 to firmly support a fixed tubular hinge or pivot mount 48 for pivotally supporting the deck assembly 50. The frame 30 is preferably permanently attached to case in steel in the building floor at its rear pivot end.

The deck assembly 50 includes a support frame 51 and a deck 60. The deck assembly 50 and deck 60 are movable through a range of inclined positions between raised and lowered positions as discussed below. The frame 51 has six evenly spaced, parallel beams 52a–f and side plates 53 joined together by a rear plate 54 and a header plate 55. The front end of each beam 52a–f is welded or otherwise rigidly secured at evenly spaced increments to the inside or front surface of the rear plate 54, and the front end of each beam is welded or otherwise rigidly secured at the same evenly spaced increments to the inside or rear surface of the header plate 55. The top of the outside or rear surface of the rear plate 54 is firmly and pivotally secured to the hinge 48 at the top of the risers 42 of the support frame 30. Two spring mounts are secured to the underside of the deck frame 51 as discussed below.

The header plate 55 has a rectangular shape and is aligned substantially vertical and perpendicular to the lower and upper surfaces 66 and 67 of the deck 60 as best shown in FIGS. 5 and 10A–10G. The plate 55 is aligned parallel to and offset a slight distance rearwardly from the front edge 64 of the deck 60. The plate 55 has a predetermined height defined by its parallel top and bottom ends 56a and 56b, a predetermined width defined by its parallel side ends 57a and 57b, and a predetermined thickness defined by its parallel front and rear surfaces 58a and 58b. Each side end 57 is generally evenly aligned with its corresponding side end of the deck 60. The front surface 58a has a first set of four evenly spaced, parallel lugs 59a–d, a central lug 59e, and a second set of four evenly spaced lugs 59f–i. Each lug 59a–i extends perpendicularly outward or forward from the front surface 58a of the plate 55. Lugs 59b–d are each linearly aligned with one corresponding beam of the beams 52a–c of the deck frame 51, and lugs 59f–g are each linearly aligned with one corresponding beam of beams 52d–f.

Figure 5:
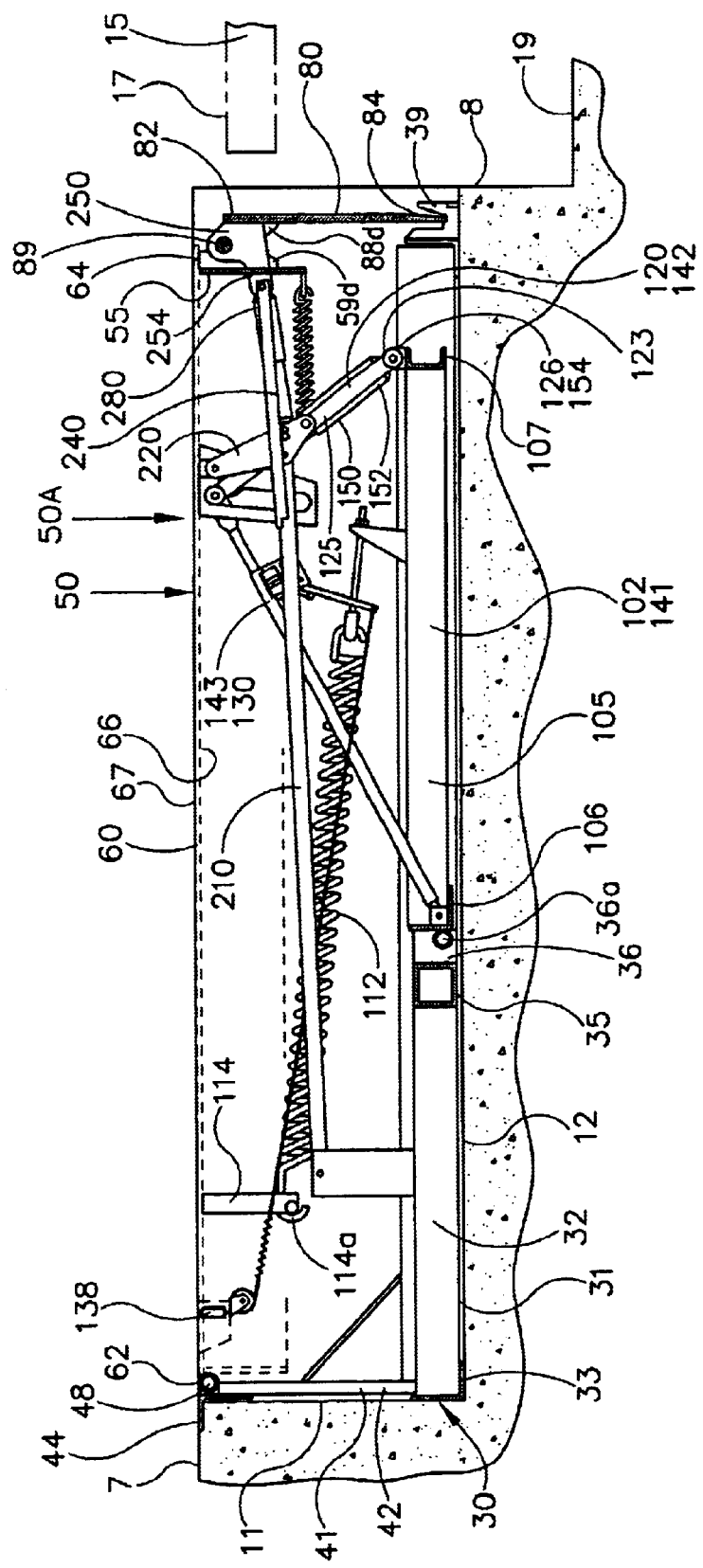
FIG. 5 is a side sectional view of the dock leveler in its parked position and showing the mounting frame, the deck assembly, and both the deck lift assembly and lip extension mechanism.
Figure 6A:
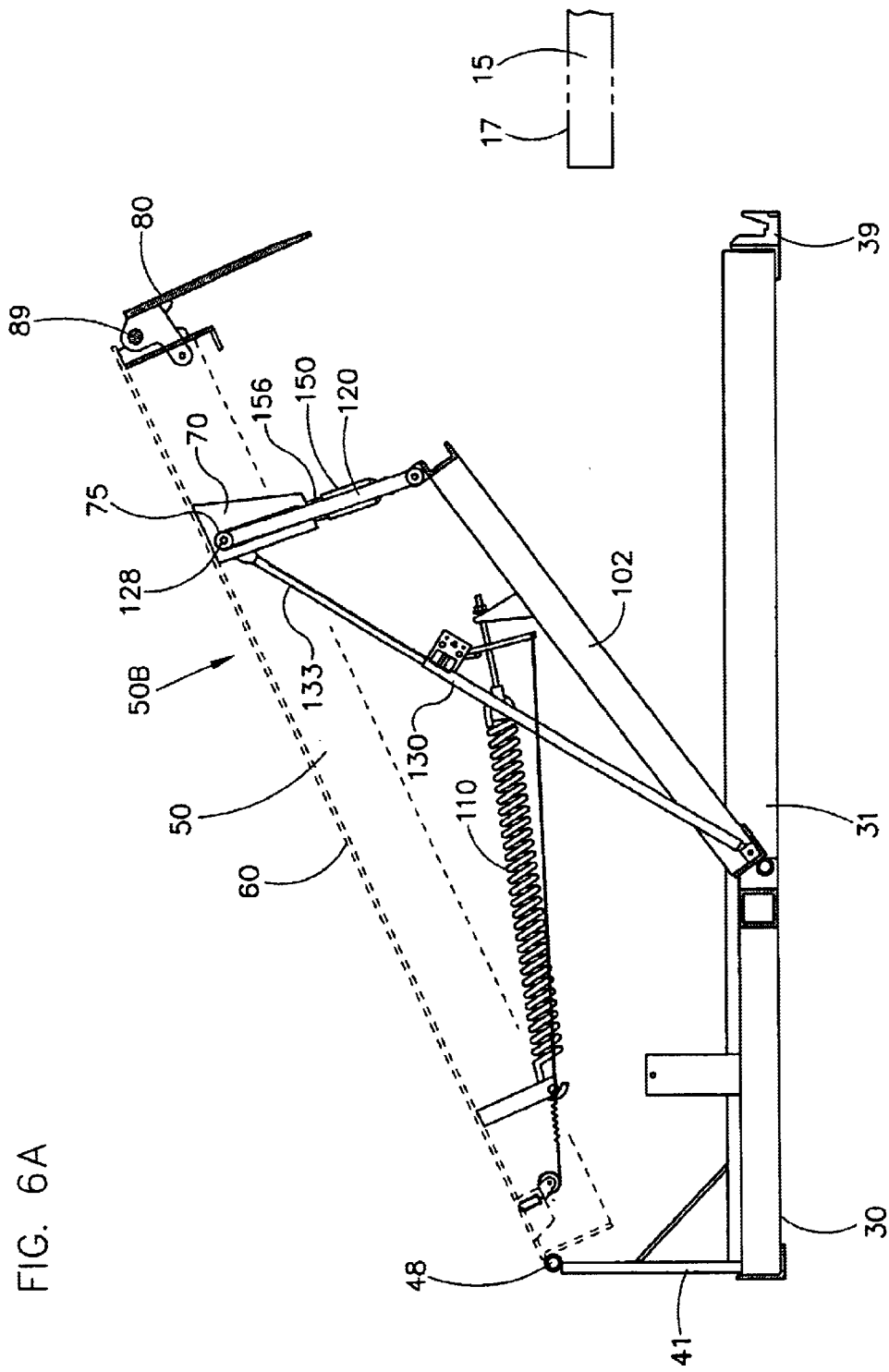
FIG. 6A is a side sectional view of the dock leveler in a raised position showing the mounting frame, deck assembly and deck lift assembly.
Figure 6B:
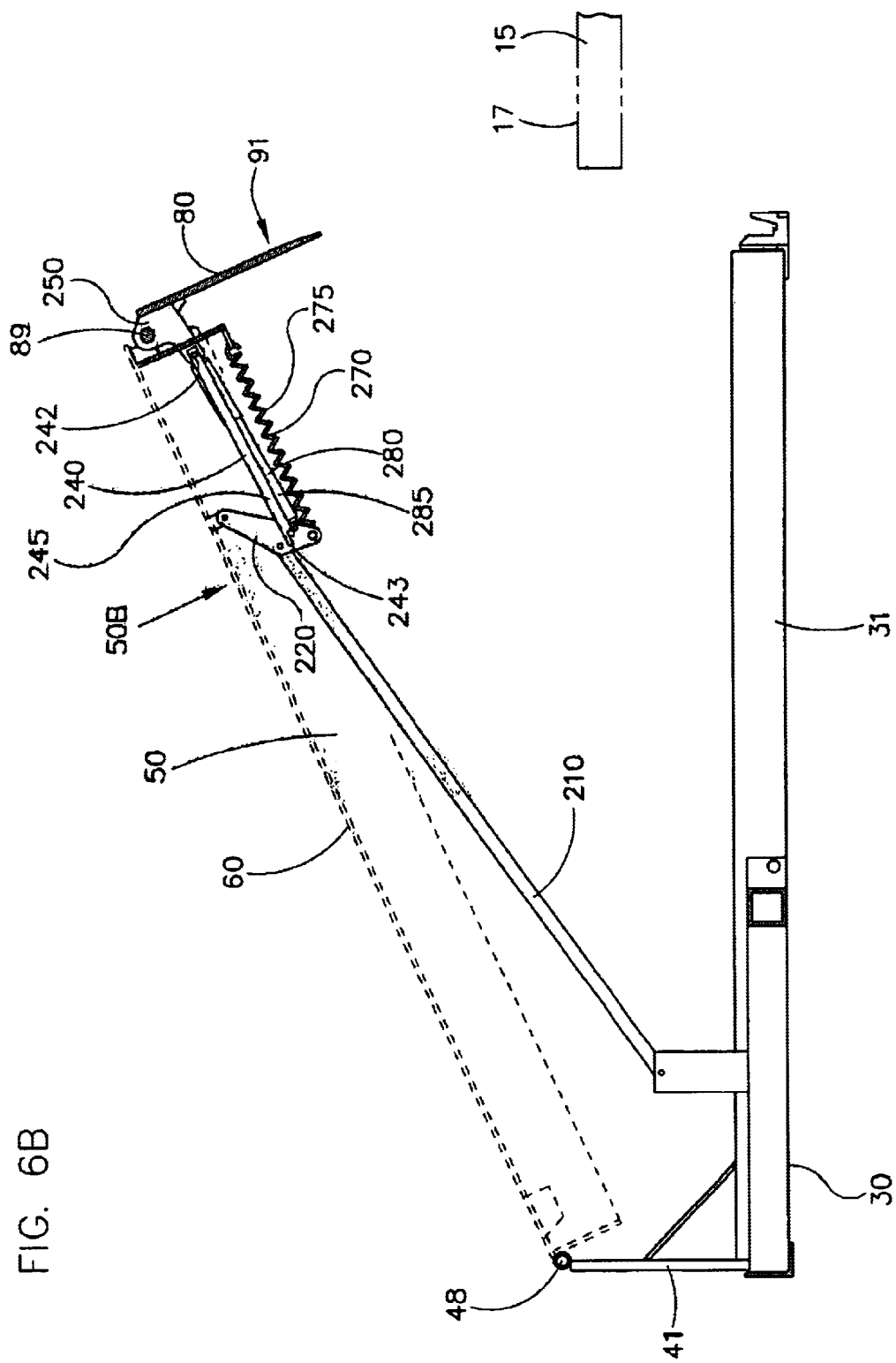
FIG. 6B is a side sectional view of the dock leveler in its raised position showing the mounting frame, deck assembly and lip extension mechanism.

The deck 60 is preferably a sheet or plate of metal. The deck 60 has a predetermined length defined by its parallel rear and front ends 62 and 64. The rear end 62 is flushly aligned with the rear plate 54, and its front end 64 extends slightly beyond the header plate 55. The deck 60 has a predetermined width defined by its parallel side edges 65, each of which extends a slight distance beyond its corresponding side plate 53. The deck 60 has a predetermined thickness defined by its parallel lower and upper surfaces 66 and 67. The lower surface 66 is welded or otherwise rigidly secured to the frame 51, and its upper surface 67 is generally flat and free and clear of obstructions. The upper end of the rear plate 54 is continuously welded to the lower surface 66 of the deck 60, and the upper end 56a of the header plate 55 is continuously welded to the lower surface 66 from one side 65 and 57 of the deck and header plate to the other. The deck assembly 50 is pivotally secured to hinge 48 so that the upper surface 67 of the deck is parallel to the floor 7 of the deck 5 when the deck is in its home or parked position 50A as shown in FIG. 5.

The deck assembly 50 includes a float housing 70. The float housing 70 has two like-shaped, generally planar, spaced apart plates 72 that extend downwardly from the deck 60. The upper end of each plate 72 is preferably welded or otherwise rigidly secured the underside 66 of the deck 60, and are located about midway between the side edges of the deck and between the support beams 52c and 52d. Each plate 72 has a substantially linear slot 74 with predetermined width and length dimensions. The plates 72 and their slots 74 are in substantial registry when viewed from the side and have upper and lower ends 75 and 76. The slot 74 is substantially vertical when the deck 60 is in its horizontal or parked position 50A.

The deck assembly 50 includes the extendable lip 80 that has a generally rectangular shape and is hingably or otherwise pivotally secured to the header plate 55. The lip 80 has a predetermined length defined by its parallel inner or hinged end 82 and its outer or free end 84. The lip 80 has a predetermined width defined by its parallel side edges 85, each of which is aligned in the same plane as its corresponding side edge 65 of the deck 60. The lip 60 has a predetermined thickness defined by its generally parallel lower and upper surfaces 86 and 87. The upper surface 87 is slightly sloped toward the lower surface 86 near outer end 84.

Figure 7A:
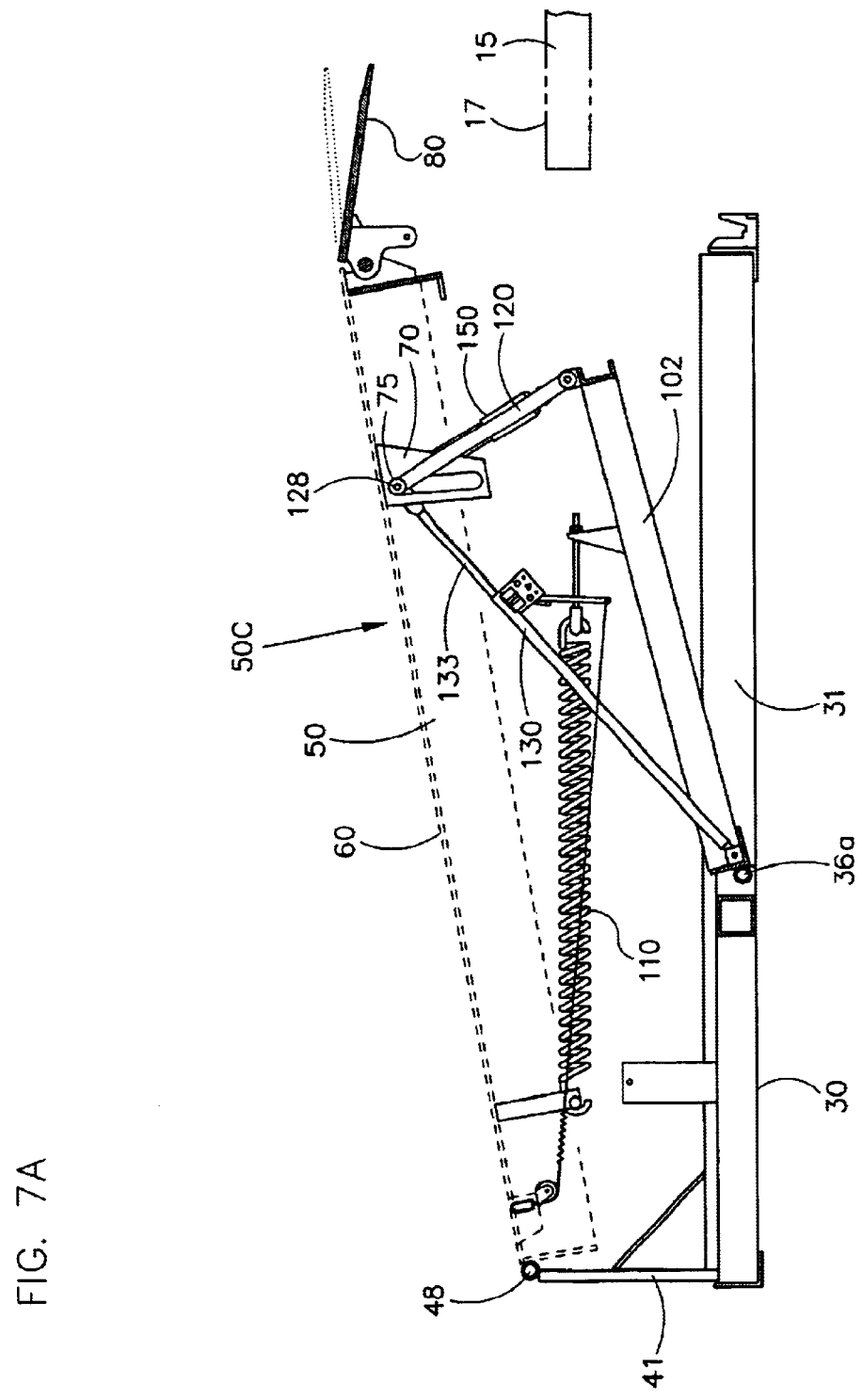
FIG. 7A is a side sectional view of the dock leveler in a dynamically extended position and showing the mounting frame, deck assembly and deck lift assembly.
Figure 7B:
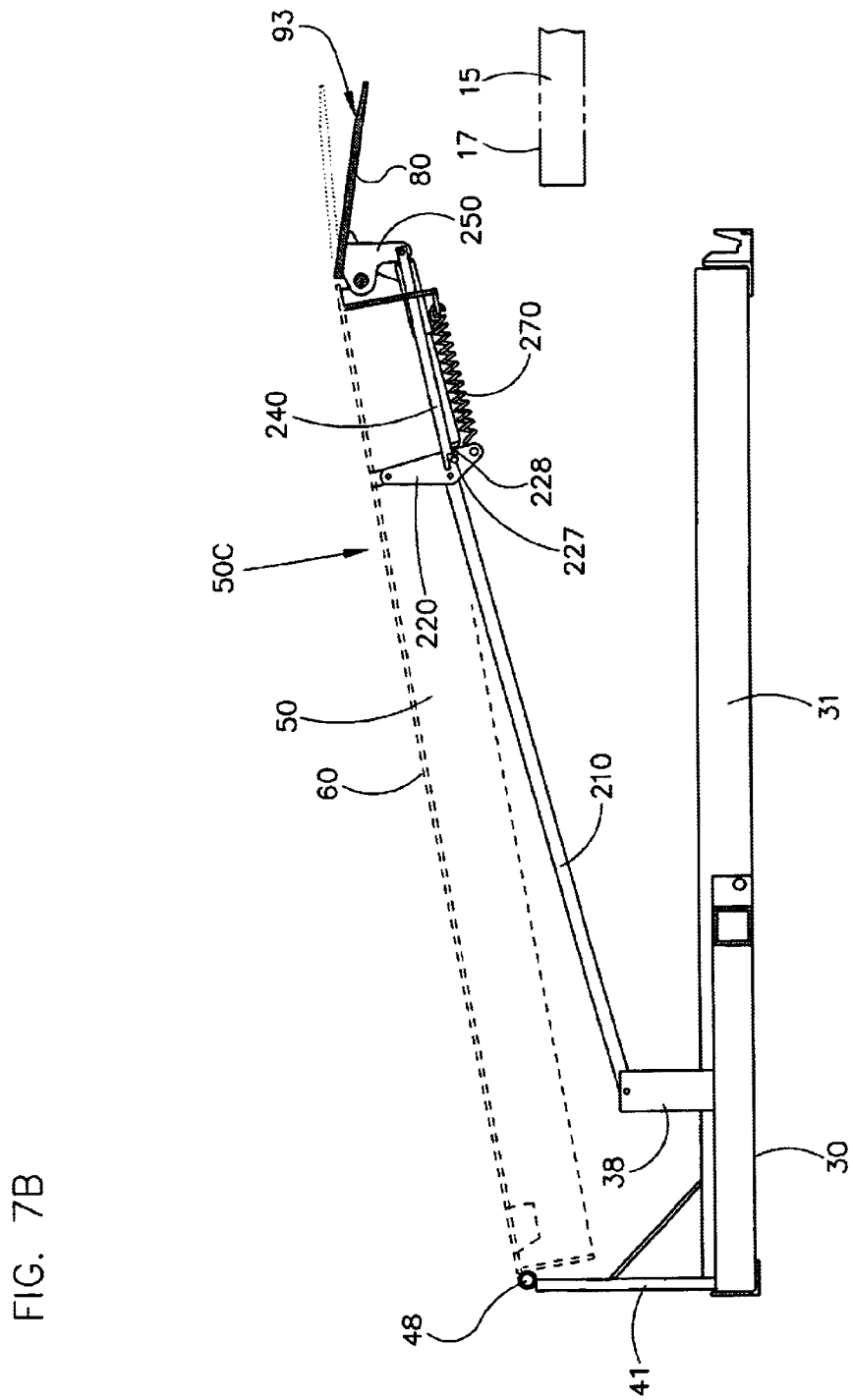
FIG. 7B is a side sectional view of the dock leveler in its dynamically extended position showing the mounting frame, deck assembly and lip extension mechanism raising the lip to an extended position.

The lower surface 86 of the lip 80 has eight substantially evenly spaced, parallel lugs 88a–i located along its hinged inner end 82. One set of four lugs 88a–d is located along the length of one half of the lip 80, a middle lug 88e is located at the center of the lip, and a second set of four lugs 88f–i is located along the length of the other half of the lip. Each lug 88a–i is perpendicular to and extends rearwardly or downwardly from the lower surface 86. Each lug 88a–h is aligned to flushly engage one corresponding lug 58a–i of the header plate 55. The side of each lip lug 88a–i flushly engages the side of its corresponding header lug 59a–i. Lip lugs 88a–e engage the left side of their corresponding header lug 58a–e, and lip lugs 88f–i engage the right side of their corresponding header lug 58f–i. Each header lug 58a–i and each lip lug 88a–i has a hole. These holes are linearly aligned holes to receive the pivot rod 89. The pivot rod 89 passes through each hole in the lugs 58a–i and 88a–i to pivotally connect the lip 80 to the deck assembly 50. The lip 80 is adapted to move between a pendant or hanging position 91 as in FIGS. 3, 5, 6A and 6B, and a fully extended position 92 as in FIGS. 9 and 10A–10G, or any intermediate or partially extended there between such as positions 93 as in FIGS. 7A and 7B. The lip 80 is biased into its hanging position 91 by its own weight. When in its hanging position 91, the lip 80 is generally parallel to the header plate 55. When lifted to its fully extended position 92, the rear of hinged end 82 of the lip 80 abuts the front or free end 64 of the deck 60, and the lip is generally parallel to the deck.

Figure 3:
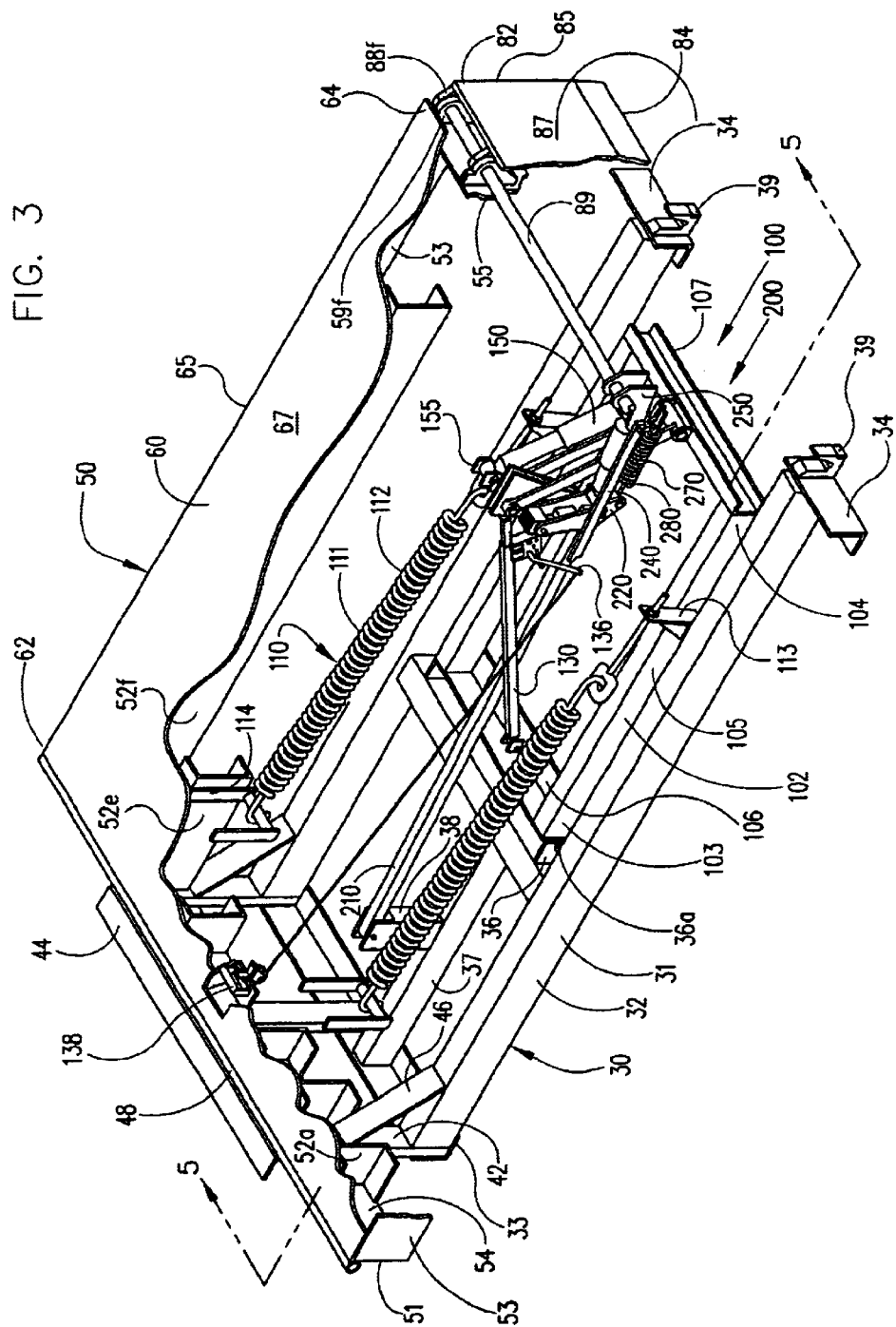
FIG. 3 is a perspective view of the dock leveler in its parked position with the deck and lip cut away to show the mounting frame, deck lift assembly and lip extension mechanism.
Figure 4:
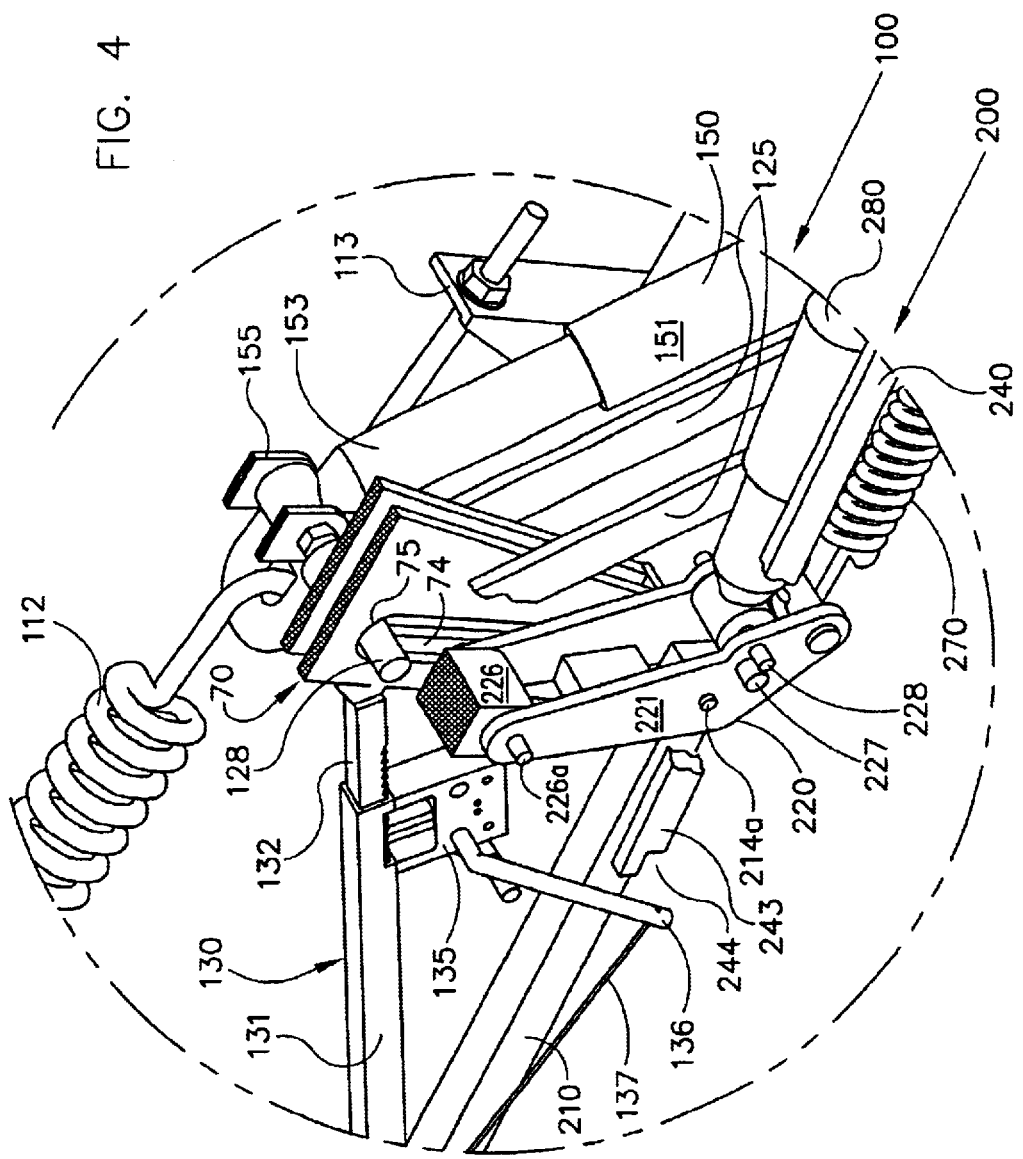
FIG. 4 is an enlarged view of a portion of FIG. 3 showing the orientation and structure of some of the components forming the deck lift assembly and lip extension mechanism.

The dock leveler 20 has a deck lift assembly 100 shown in FIGS. 3–5 for releasably supporting the deck assembly 50 and raising and lowering it through a range of positions between upper and lower positions by pivoting or rotating it up or down about hinge 48. FIGS. 5A, 6A, 7A, 8A and 9 show the lift assembly 100 with the deck assembly 50 in its parked position 50A, raised position 50B, dynamically extended position 50C, engaged position 50D and float position 50E, respectively. The lift assembly 100 includes a lower lift frame or arm 102 with an inner pivoting end 103 and a free end 104. The lower lift frame 102 is formed by two spaced support or side beams 105 that are integrally joined together at the inner end 106 by a cross mount 107 and at the free end 104 by a cross beam 106 so that these components move in unison. The support beams 105 are located between the side beams 32 of the base frame 31, and are generally parallel to the beams 32 when the deck assembly 50 is in its home or parked position 50A as in FIGS. 3, 5 and 5A. The cross mount 107 is pivotally secured to the pivot rod 36a of the base frame 31 so that the lower lift arm 102 is free to rotate about the pivot rod.

A lift biasing mechanism 110 that continuously biases the deck into its fully raised position 50B. The free end 104 of the lift arm 102 rotates or pivots upwardly about pivot rod 36a as in FIG. 6A. The lift biasing mechanism is formed by a set of two spring attachments 111. Each spring attachment 111 includes a spring 112, an adjustable mount 113 and a rigid mount 114. One adjustable mount 113 is secured to each of the two side beam 105 at a location a little more than half way toward its free end 104. This mount 113 includes a threaded rod and bolt for tightening or loosening the tension on the spring 112. Each rigid mount 114 is secured between two adjacent beams 52 toward the rear of the deck frame 51. One mount 114 is secured to beams 52b and 52c, and the other is secured to beams 52d and 52e. Each rigid mount 114 has a rod 114a that extends laterally between its respective beams 52b and 52c or 52d and 52e. One end of each spring 112 is hooked or otherwise pivotally secured to its adjustable mount 113, and the other end is hooked or otherwise pivotally secured to the rod 114a of its corresponding rigid mount 114.

The deck lift assembly 100 includes an upper lift arm 120 with lower and upper ends 123 and 124. The lift arm 120 is formed by two like-shaped struts 125, a hinge mount 126 and a push rod 128. The struts 125 are parallel and spaced apart to straddle the plates 72 of the float housing 70, and are generally planar to the plates 72. The lower pinned end 123 of each strut 125 is pivotally attached to the hinge mount 126 so that the upper lift arm 120 is free to rotate or pivot about the hinge mount. The upper ends 124 of the struts 125 have aligned holes for securely receiving the push rod 128. The push rod 128 has a predetermined diameter sized to snuggly fit and freely move inside the slot 74 of the float housing 70 from one end 75 of the slot to the other 76.

A hold down mechanism 130 is provided to hold the deck assembly 50 at its parked position 50A as in FIGS. 3, 5 and 5A or at a desired inclined position such as engaged position 50D as in FIG. 8A. The deck lift assembly 100 continuously biases the deck 50 up toward its fully raised position 50B as in FIG. 6A. The hold down mechanism 130 includes a conventional telescoping hold down bar 131 formed by a first fixed bar 132, a telescoping bar 133 with an outer end 134, and a ratchet mechanism 135. The fixed bar 132 has an end that is firmly pinned to the cross mount 106 of the lower lift arm 102. Its outer end is adapted to securely receive the one-way ratchet mechanism 135. The ratchet mechanism 135 includes a locking mechanism with a release lever 136 and release activation mechanism 137 formed by a cable and a handle 138 that is accessible from the deck 50. The locking mechanism is biased into a locked position. Unlocking the lock mechanism to an unlocked position by rotating release lever 136 via releasing activation mechanism 137 allows the telescoping bar 133 to telescope out or retract.

The telescoping bar 133 is notched along one face so that the length of the hold down bar 131 can be set to a desired length by the ratchet mechanism 135. The telescoping bar 133 can extended through a range of extend positions between a retract position and a fully extended position The ratchet mechanism 135 allows its overall length to shorten or retract at any time, but only allows its length to lengthen or telescope out when the lever is released by the operator. The outer end 134 of the telescoping bar 133 passes between the plates 72 of the float housing, and securely and pivotally receives push rod 128. The telescoping bar 131 is integrally and pivotally joined to the upper lift arm 120 by the push rod 128 to form a joint that remains inside the slot 74. The lower arm 102, upper arm 120 and hold down mechanism 131 form a triangular structure 140 that can vary in its shape as discussed below. The lower arm 102, upper arm 120 and hold down mechanism 131 each form one side 141, 142 and 143 of the triangle 140, respectively, as shown in FIG. 5. The sides 141 and 142 formed by the lower and upper arms 102 and 120 remain constant. The side 143 formed by the hold down 131 varies through a range of lengths between its retracted and fully extended lengths. The sides 141 and 142 of the triangle 140 formed by the lower and upper arms 102 and 120 form an angle of about 45° when the deck assembly 50 is in its parked position 50A and an angle of about 110° when in the raised position 50B.

Figure 9:
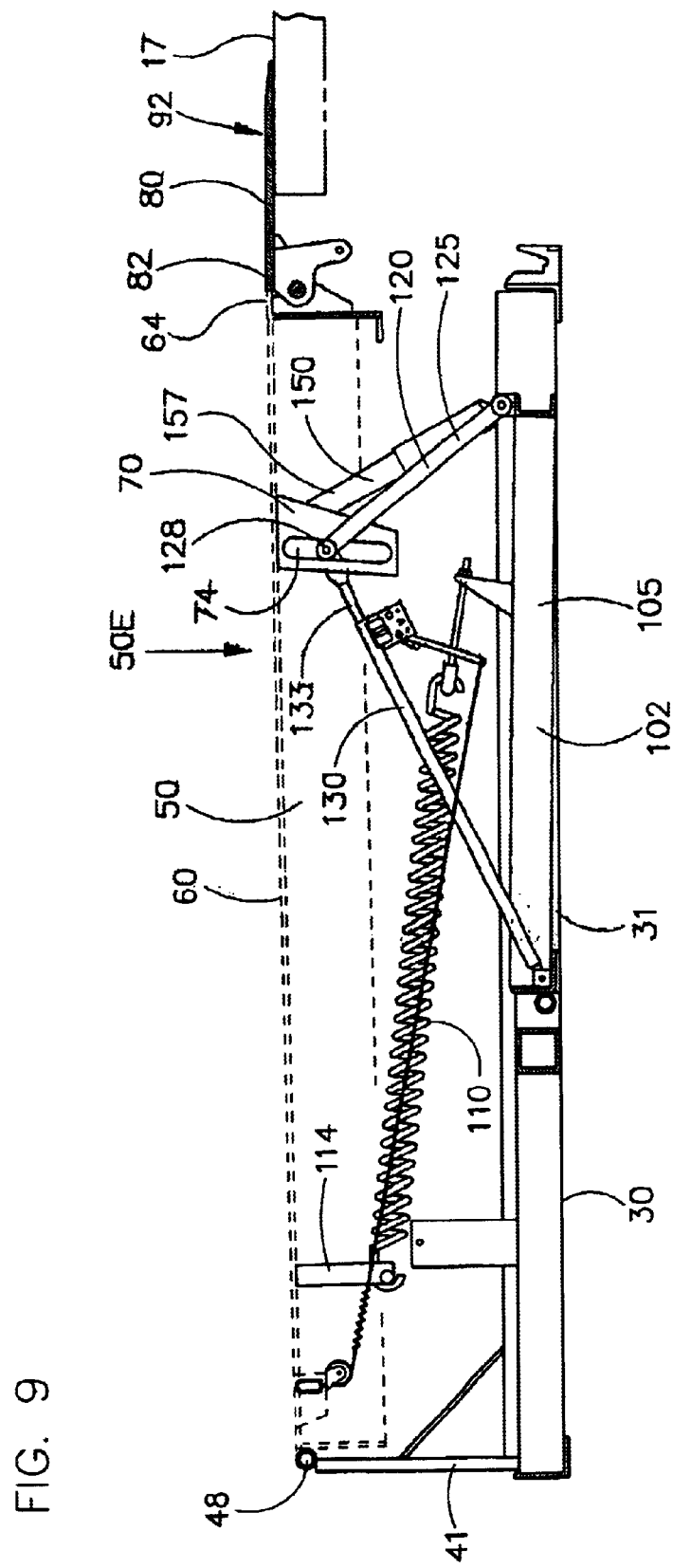
FIG. 9 is a side sectional view of the dock leveler in a floating position with the lip supportably engaging the unloaded truck bed that has risen above the level of the loading dock floor so that the deck lift assembly no longer supports the deck assembly.
Figure 10F:
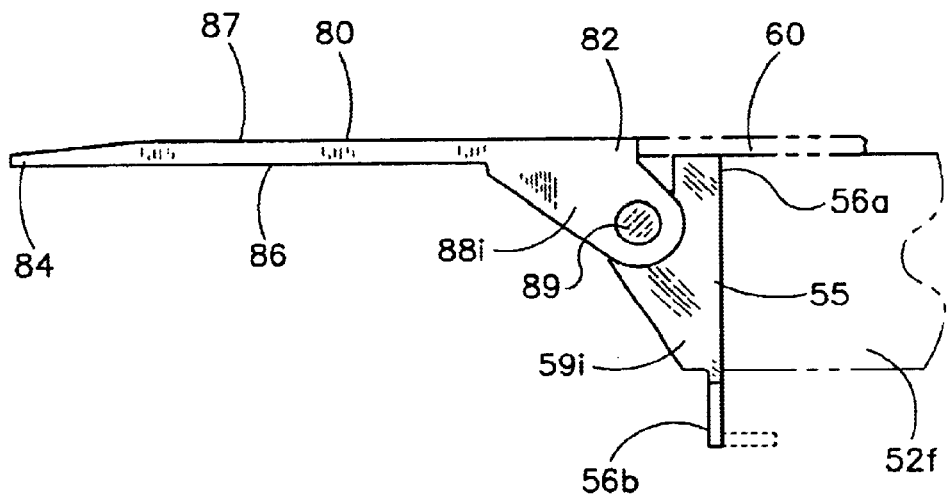
FIG. 10F is a side view of the lip and hinge plate of the dock leveler.
Figure 10G:
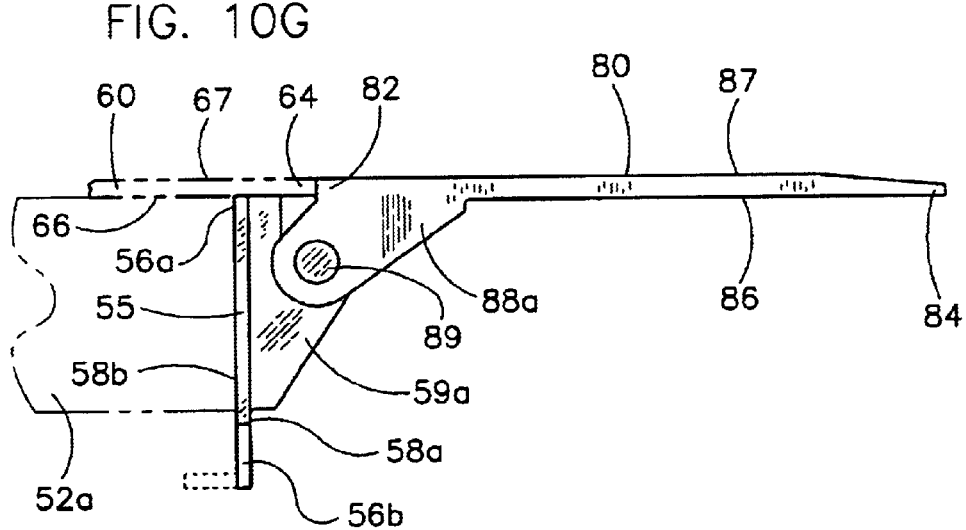
FIG. 10G is a side view of the lip and hinge plate of the dock leveler.

A damper 150 controls the rate of speed the deck assembly 50 and lift assembly 100 move relative to each other, such as when the deck assembly is in a float position 50E as in FIG. 9. The damper 150 has a first half with a first end 152, and a mating second half with a second end 153. The first end 152 is pivotally secured to a bracket 154 welded to the cross beam 107 at the outer end 104 of the lower arm 102. The second end 153 is pivotally secured to a bracket 155 welded to the underside of the deck 60. When the push rod 128 is located at the upper end 75 of the slot 74 as in FIGS. 5–8, the damper 150 is in a retracted or deactivated position 156. When the push rod 128 is spaced from the upper end 75 of the slot 74 as in FIG. 9, the damper 150 is in an extended or activated position 157. The deck damper 150 resists compression to control the rate of speed that the deck assembly 50 drops when the trailer 15 leaves the dock 5 with the deck assembly 50 in its floating position 50E. The deck damper 150 also controls the rate of speed that the lift assembly 100 rises when the hold down mechanism 130 is released and the deck assembly 50 is in the floating position 50E.

The dock leveler 20 has a lip extension assembly 200 shown in FIGS. 3–5 for extending the lip 80 for engagement with a trailer bed 17. FIGS. 5B, 6B, 7B and 8B show the lip extension assembly or mechanism 200 with the deck assembly 50 in its parked position 50A, raised position 50B, dynamically extended position 50C and engaged position 50D, respectively. The mechanism 200 lifts or rotates the lip 80 from its pendant position where it is substantially perpendicularly oriented to the deck 60 as in FIG. 6B to its extended position where it is substantially horizontal and relatively planar to the deck 60 or dock floor 7 as in FIG. 7B.

The lip extension mechanism 200 is formed by a number of components including a push bar or drive member 210, a crank or connector 220, a drive link 240 and a drive bracket 250. These components are arranged one adjacent to the other, and are connected or otherwise securably or releasably linked together in series to work in unison to extend the lip 80 of the deck assembly 50. The components are permanently or releasably joined or secured to the others in force transmitting communication to enable the lip extension assembly 200 to push or drive the lip plate 80 from its pendant position toward its extended position. The push bar 210 has a predetermined length and first and second ends 213 and 214. The first or load bearing end 213 is pinned or otherwise pivotally secured the pivot rod 38a on the post 37 of the base frame 31. The crank 220 is formed by a plate 221 having a predetermined length with opposed ends 222 and 223. The crank plate 221 has a wider mid section 224 so that it takes on a generally triangular shape with a third end 225.

One end 222 is pinned or otherwise pivotally secured to the underside of the deck 60 via a mounting bracket 226 and rod 226a. The mid section end 225 of the crank plate 221 is pinned or otherwise pivotally secured to the second end 214 of the push bar 210 via a rod 214a. A pair of studs 227 and 228 extend from one side of the crank plate 221. The first or drive stud 227 is located between free end 223 and mid section end 225. The second or release stud 228 is slightly offset from the drive stud 227 in the direction of the free end 223.

The drive link or rod 240 moves between engaged or disengaged positions at predetermined angles of deck incline to selectively extend the lip 80 when the deck is being lowered or to allow the lip to rotate under its own weight to its pendant position 91. The drive link 240 has a predetermined length and first and second ends 242 and 243. The second free end 243 has a notch 244 to receive and abutingly engage the drive stud 227. As the deck 50 is raised, as in FIG. 6B, the crank plate 221 is pulled or rotated back by the push bar 210 so that the drive stud 227 is above the release stud 228 and the notched end 243 of the link 240 is aligned over the drive stud 227. The notched end 243 of the link 240 drops down under its own weight so that the drive stud 227 is received by the notch 244. The drive link 240 is now in its engaged position 245. The degree of incline needed to allow the crank 220 and drive link 240 to move into their engaged position 245 is partially determined by the length of the drive link. When the drive link 240 is in its engaged position 245 and the deck 60 is "walked down," the push bar 210 pushes the crank plate 221 and drive link 240 forward to extend or raise the lip 80. The crank 220 and drive link 240 move toward their release or disengaged position 247 when the deck assembly 50 approaches its dynamic extended position 50C as in FIG. 7B. The release stud 228 engages the bottom side of the drive link 240 and pushes its free end 243 up and out of engagement with drive stud 227. The drive link 240 is shown in its release position in FIG. 8B.

The drive bracket 250 is formed by two like-shaped plates 252. The plates 252 are spaced apart and parallel when viewed from the front, and in registry when viewed from the side. The plates 252 are joined by a bracket (not shown) so that they move in unison. Each plate 252 has first and second ends 253 and 254. A pivot hole is located toward the first end 253 of each plate 252 to pivotally receive pivot rod 89. The first end 253 has a flat abutment 255 adapted to flushly and releasably engage the underside 86 of the lip 80. The second end 254 is pinned or otherwise pivotally secured to the first end 242 of the drive ling 240 by a pivot rod 254a. When the drive link 240 is engaged and the deck 60 is being lowered, the drive link 240 pushes the drive bracket 250 and rotates it forward about pivot rod 89. The abutment 255 flushly engages the underside 86 of the lip 80 and rotates the lip to an extended position, such as when the deck assembly 50 is in its dynamically extended position 50C. The lip 80 is now substantially horizontal to the floor 7 and trailer bed 17, and its upper surface 87 approaches a generally parallel alignment to the upper surface 67 of the deck 60. When the drive link 240 is disengaged and the drive bracket 250 is not being forced forward, the weight of the lip 80 biases it to rotate down until it engages the surface of the trailer bed 17. When the trailer 15 pulls away from the loading dock 5 or there is no trailer in front of the dock leveler 20 when it is being lowered, the weight of the lip 80 biases it into its generally vertical pendant position 91 so that its free end 84 is able to mate into or be received by the lip supports 39.

The lip extension 200 includes an assist spring 270 and a damper 280 for helping extend the lip 80. The spring 270 is stretchable through a range of lengths. The spring 270 has a first end 272 that is hooked or otherwise pivotally secured to the free end 223 of the crank plate 221, and another end 273 that is hooked or otherwise pivotally secured to a bracket 274 welded to the rear surface of the header plate 55. When the push bar 210 and crank 220 are pulled or rotated back as in FIG. 6B, the assist spring 270 is stretched to an activated position 275 to help pull the crank 220 forward and extend the lip 80 via the drive link 240 and drive bracket 250 to its extended position 93 as in FIG. 7B. The decoupling of the drive link 240 from the crank 220 deactivates the assist spring 270. When the lip 80 is extended and the deck 60 continues to be walked down so that the lip engages the trailer bed 17 as in FIG. 8B, the spring 270 recoils and is in a deactivated position 287 that does not resist the lip from falling back to its pendant position 91. This resistance is controlled by the damper 280.

The damper 280 is movable between retracted and extended lengths. The damper 280 has a first half 283 with a shaft that fits between the two plates 252 of the drive bracket 250. The end of the shaft has an opening for receiving rod 254a and pivotally securing the damper 280 to the bracket 250. The damper 280 has a second half 284 with an opposed shaft. The end of this shaft is pivotally secured to the free end 223 of the crank plate 221 in the vicinity of the drive stud 227 so that the damper is roughly parallel to the drive link 240. When the deck assembly 50 is in its parked position 50A as in FIG. 5B, the damper 280 is in a retracted or otherwise deactivated position 287. When the deck assembly 50 is raised and the push bar 210 and crank 220 are rotated back as in FIG. 6A, the damper 280 is pulled to an extended or activated position 285 in which the damper is filled with air. The damper 280 is designed to freely allow it to open to its extended position 285 so that it does not inhibit raising the deck assembly 50, and to resist sudden closing to its retracted position 287. When the push bar 210 and crank 220 are pushed or rotated forward in a relatively quick manner, such as when the deck is being walked down between FIGS. 7B and 8B, the damper 280 resists being rapidly pushed into its retracted position 287. Even though the drive link 240 disengages, the damper 280 continues to maintain the lip 80 in its extended position 93 by actively resisting the lip from rotating down during the relatively quick decent of the deck 60.

Operation of the Dock Leveler

Although the operation of the dock leveler should be apparent given the above discussion, the following is provided to assist the reader. When the dock leveler 20 is in its parked position 50A as in FIG. 5, the operator pulls a handle 138 that releases the hold down device 130, which allows the biasing mechanism 110 to raise the lower arm 102 upwardly by rotating it about pivot rod 36a. This upward movement of the lower arm 102 simultaneously causes the outer end 124 of upper arm 120, which must remain in slot 74 of the float housing 70, to rotate away from the lower arm 102. The push rod 128 of the arm 120 pushes up against the upper end 75 of the float housing 70, which causes the deck or ramp assembly 50 to pivot upwardly about its rear end 62 and hinge 48 so that the front end 64 rises to its raised position 50B as in FIG. 6A. As the ramp assembly 50 ascends, the push bar 210 pulls the extension crank 220 back. The crank 220 pivots about its pinned end 222, which is secured to the underside 66 of the ramp 60. As the ramp assembly 50 approaches the extent of its upward motion, the linkage arm 240 slides from an inoperative position 247 to an operative or engaged position 245 by locking its notched end 244 into secure engagement with the pivot pin or drive stud 227 of the crank 220 as in FIG. 6B. As the deck assembly 50 rises, the lip assist spring 270 extends from an at rest position 277 to a stretched or powered position 275 to bias the crank 220 and lip 80 forward, making it easier to extend the lip. As the deck assembly 50 rises, the damper 280 is also pulled in to an operative position 285.

With the linkage arm 240 engaged, the assist spring 270 and damper 280 activated, and the relative motion of the ramp 60 stopped in its raised position 50B, the operator then walks forward on the deck or ramp 60 towards the lip 80 toward its front edge 64. The weight of the operator overcomes the force of the lifting springs 112 and the ramp descends as in FIGS. 7A and 7B. As the ramp 60 begins to descend, the lip 80 begins to extend via the interconnected drive bracket 250, linkage arm 240, extension crank 220 and push bar 210 connected to the stationary frame 30. As the ramp assembly 50 rotates and moves forward and downward into its dynamic or intermediate position 50C, the forward rotation of the extension crank 220 and the orientation of the drive and release studs 227 and 228 cause the linkage arm 240 to unlock or disengage. The damper 280 does the final extension of the lip 80 onto the trailer bed 17 to engaged position 50D. At this time, the lip assist spring 270 reverts to its deactivated position 277. This allows the lip 80 to retract or pivot down into its pendant position 91 restricted only by the damper 280 so that the lip retracts more quickly and more easily than a conventional assisted lip.

As the ramp 60 continues to descend, the lip 80 extends onto the trailer bed 17 and into engaged position 50D as in FIGS. 8A and 8B. The operator is now free to drive a forklift or lift truck in and out of the trailer across the ramp 60 and lip 80. As a trailer 15 is unloaded, its suspension springs raise its trailer bed 17. As the trailer bed 17 raises, the lower arm 102, upper lift arm 120 and hold down 130 do not move. The springs 112 continue to pull with the same force on the lower lift arm 102, but the hold down mechanism 130 continues to maintain the lower lift arm, upper lift arm 120 and hold down mechanism in a fixed pattern 140. The ends 124 and 134 of the upper arm 120 and hold down mechanism 130 are pinned together by the push rod 128, which remains inside the slot 74 of the float housing 70, but are not rigidly secured to the deck assembly 50. This releasable attachment of the triangle 140 to the deck assembly 50 allows the operator to control the incline position of the deck 50. The releasable attachment also allows the deck lift assembly 100 and triangle 140 to release from the deck 50 to allow its rear end 62 to pivot about hinge 48 and the forward end 64 and lip 80 to float atop a trailer 15 as goods 19 are unloaded from or loaded onto the trailer. When the lip 80 is fully extended and resting on the trailer bed 17, the inner or pinned rear end 82 of the lip 80 is in abutting engagement with the front end 64 of the deck 60, which prevents further rotation of the lip and fixes the lip into parallel alignment with the deck 60. Thus, when the trailer bed 17 and lip rise, the lip pulls the front end 64 of the deck assembly 50 and ramp 60 in a generally vertical direction as in FIG. 9. The full weight of the ramp assembly 50 and its lip 80 are applied to the trailer 15, less the weight carried by the hinge 48. As a result, the lift springs 112 are no longer applying force on the ramp 60, which eliminates the forces that cause a "bounce effect" as the fork lift moves across the ramp and onto the trailer bed.

When the load 18 is placed on the trailer bed 17, the trailer bed drops down due to the weight of the load. The lip 80 and deck assembly automatically pivotally adjust downward so that the outer end 84 of the lip remains in engagement with the bed 17. The lip will initially pivot down under its own weight. The deck assembly 50 will pivot down when a person or forklift travels back onto the deck 60 until the rear end 82 of the lip 80 is again in abutting engagement with the front end 64 of the deck 60. The deck assembly 50 can pivot down until its lower arm 102 bottoms out against the floor 12 of the pit 10. It should be understood that the floor 12 can be recessed further beneath the lift assembly 100 to allow the deck assembly 50 to be pivoted downward or lowered significantly below the surface 7 of the deck 5 without departing from the broad aspects of the invention.

When the trailer 15 has been loaded or unloaded and is ready to pull away, the operator can use the handle 138 to release the hold down mechanism 130 to raise the deck assembly 50 to an intermediate or slightly inclined position that is below the dynamic position 50C so that the drive link 240 is not engaged. The lip 80 then pivots down to its pendant position 91 generally perpendicular to the deck 60 and parallel to the header plate 55. The operator then walks down the deck so that the deck assembly 50 is in its parked position 50A where the lip 80 is received by or mates into and is supported by the lip supports 39. Should the trailer pull away while the deck assembly 50 and its lip 80 are floating and still engaging and supported by the trailer bed 17 as in FIG. 9, the deck assembly will simply pivot down until the push rod 128 of the lift assembly 100 engages the upper end 75 of the slot 74 of the float housing 70. The deck damper 150 controls the speed and cushions the decent of the deck assembly 50. The lip 80 will also simply pivot down until it is in a generally vertical hanging position 91. The lip damper 280 controls the speed and cushions the decent of the lip 80. From this disengaged position, the operator can walk down the deck to its parked position A if the free end 84 of the lip 80 is above the lip supports 39, or the operator can raise the deck assembly 50 to the intermediate or slightly inclined position and walk down the deck to put it in its parked position 50A.

While the invention has been described with reference to a preferred embodiment, it will be understood by those skilled in the art that various changes may be made and equivalents may be substituted without departing from the broad aspects of the invention.

I claim:

1. A dock leveler for forming a bridge between a floor of a loading dock and a trailer bed, the trailer bed being adapted to support a load and rise when that load is removed, said dock leveler comprising:

a deck assembly with a first hinged end, a second outer end, a float housing with an abutment and a deck with a lip, said deck being movable through a range of inclined positions between raised and lowered positions;

a lift assembly including a lift member and a biasing mechanism, said lift member releasably supporting said deck assembly at said abutment and being upwardly and downwardly movable through a range of positions between upper and lower positions, said biasing mechanism biasing said lift member upwardly toward its said upper position and said deck toward its said raised position;

a hold down mechanism joined to said lift member, said hold down mechanism being operable to selectively prevent said lift member from moving upwardly toward its said upper extended position, said lift assembly and hold down mechanism combining to operably raise and lower said deck while said lift member remains in supporting engagement with said deck assembly to position said lip on the trailer bed; and, wherein said deck assembly releases from its said supporting engagement with said lift member when the load is removed and the trailer bed rises, said deck and lip being supported by and rising with the trailer bed.

2. The dock leveler of claim 1, and wherein said outer end of said deck assembly is suspended when supportably engaged by said lift assembly, said lift assembly supporting said suspended deck assembly as it moves said deck through its said range of inclined positions.

3. The dock leveler of claim 2, and wherein said lift assembly and hold down mechanism combine to biasingly hold said deck at a desired inclined position and allow said deck to move to a lower incline position under a predetermined condition when said outer end of said deck assembly is suspended.

4. The dock leveler of claim 3, and wherein said predetermined condition is an operator walking onto said deck and toward said outer end.

5. The dock leveler of claim 4, and wherein said deck is horizontally flush with the floor of the loading dock when said deck is in a parked position.

6. The dock leveler of claim 5, and wherein said lip is positioned above the bed of the trailer when in said raised position, said deck and lift member moving down when the operator walks onto said deck until said deck assembly and lip reach an engaged position where said lip engages the trailer bed.

7. The dock leveler of claim 3, and wherein said lip is hingably secured proximal said outer end of said deck assembly, said lip being operably movable between pendant and extended positions.

8. The dock leveler of claim 1, and wherein the loading dock floor has a pit and said dock leveler further includes a mounting frame rigidly secured inside the pit, and wherein said first hinged end of said deck assembly is hingably secured to said mounting frame proximal the floor of the loading dock, said first hinged end being flushly aligned with the floor of the loading dock and said second outer end being pivotable about said first hinged end, and said lift member and hold down mechanism are pivotally secured to said mounting frame.

9. The dock leveler of claim 8, and wherein said lift member is formed by lower and upper lift arms, said lower lift arm being pivotally secured to said mounting frame, and said upper lift arm being pivotally secured to said lower lift arm.

10. The dock leveler of claim 9, and wherein said float housing forms a slot, and said upper end of said slot forms said abutment against which said upper lift arm engages to releasably support said deck.

11. The dock leveler of claim 10, and wherein said lift member has an upper end, and said hold down mechanism is pivotally connected to an upper end of said upper lift arm at a joint, said joint being restricted to move in said slot.

12. The dock leveler of claim 11, and wherein said slot is substantially perpendicular to said deck.

13. The dock leveler of claim 11, and wherein said hold down mechanism includes a pivotally fixed member and a telescoping member extendably joined to said fixed member, said telescoping member being extended through a range of extend positions between a retract position and a fully extended position, and said locking mechanism locks said telescoping member to its said fixed member to prevent outward extension of said telescoping member and said upward movement of said lift member.

14. The dock leveler of claim 13, and wherein said fixed member of said hold down mechanism is pivotally secured to said pivot end of said lower lift arm and said telescoping member is pivotally secured to said upper end of said upper lift arm, said lower and upper lift arms and said hold down mechanism each forming a side of a triangle, said sides of said triangle formed by said lift arms remaining a constant length, and said side of said triangle formed by said hold down mechanism varying through a range of lengths between retracted and fully extended lengths.

15. The dock leveler of claim 14, and wherein said lift arms from an angle greater than 90 degrees when said hold down mechanism is at its said fully extended length.

16. The dock leveler of claim 9, and wherein said lift assembly includes a deck damper secured between said deck assembly and said lower lift arm, said damper controlling a rate of relative movement between said deck and lift assembly when said deck moves from supported engagement with the trailer bed into supported engagement with said lift assembly.

17. The dock leveler of claim 1, and wherein said biasing mechanism is a spring that continuously biases said lift member upwardly toward its said upper position and said deck toward its said raised position.

18. The dock leveler of claim 17, and wherein said hold down mechanism has a locking mechanism selectively moveable between locked and unlock positions, said hold down mechanism allowing said lift member to move upwardly and downwardly through its said range of positions when said locking mechanism is in its said unlocked position, said hold down mechanism preventing said movement of said lift member toward said upper position when said locking mechanism is in its said locked position, said lift assembly and hold down mechanism combining to biasingly hold said lift member at a specific position when said locking mechanism is locked, said hold down mechanism allowing downward movement of said lift member when said locking mechanism is in said locked position.

19. The dock leveler of claim 18, and wherein said locking mechanism is biased to its locked position, and is operably movable to its unlocked position.

* * * * *